United States Patent
Wakisaka et al.

(10) Patent No.: US 10,086,353 B2
(45) Date of Patent: Oct. 2, 2018

(54) METHOD AND APPARATUS FOR PRODUCING DISPERSION

(71) Applicants: NATIONAL INSTITUTE OF ADVANCED INDUSTRIAL SCIENCE AND TECHNOLOGY, Tokyo (JP); NICCA CHEMICAL CO., LTD., Fukui-shi, Fukui (JP)

(72) Inventors: Akihiro Wakisaka, Tsukuba (JP); Hitomi Kobara, Tsukuba (JP); Hirotomo Banko, Fukui (JP); Kana Ueda, Fukui (JP); Toshiki Kounishi, Fukui (JP); Daiki Nakai, Fukui (JP)

(73) Assignees: National Institute of Advanced Industrial Science and Technology, Tokyo (JP); Nicca Chemical Co., Ltd., Fukui (JP)

( * ) Notice: Subject to any disclaimer, the term of this patent is extended or adjusted under 35 U.S.C. 154(b) by 35 days.

(21) Appl. No.: 15/506,606

(22) PCT Filed: Aug. 21, 2015

(86) PCT No.: PCT/JP2015/073476
§ 371 (c)(1),
(2) Date: Feb. 24, 2017

(87) PCT Pub. No.: WO2016/031695
PCT Pub. Date: Mar. 3, 2016

(65) Prior Publication Data
US 2018/0221843 A1    Aug. 9, 2018

(30) Foreign Application Priority Data
Aug. 28, 2014    (JP) .................. 2014-174586

(51) Int. Cl.
*B01J 19/26* (2006.01)
*C08G 69/28* (2006.01)
(Continued)

(52) U.S. Cl.
CPC ......... *B01J 13/0021* (2013.01); *B01J 13/003* (2013.01); *B01J 19/087* (2013.01);
(Continued)

(58) Field of Classification Search
CPC .... B01J 13/0021; B01J 13/003; B01J 19/087; B01J 19/26; B01J 2219/0803;
(Continued)

(56) References Cited

U.S. PATENT DOCUMENTS

2010/0237523 A1*    9/2010    Bohmer ............... A61K 9/1647
264/13

FOREIGN PATENT DOCUMENTS

JP     11-106806 A    4/1999
JP     2002-012669 A    1/2002
(Continued)

OTHER PUBLICATIONS

Tsunoyama et al. "Microfluidic Synthesis and Catalytic Application of PVP-Stabilized, ~1 nm Gold Clusters", *Langmuir* 24:11327-11330 (2008).

*Primary Examiner* — Kelechi C Egwim
(74) *Attorney, Agent, or Firm* — Myers Bigel, P.A.

(57) ABSTRACT

A method and an apparatus for producing a dispersion, which enable high-speed and highly-efficient production of a dispersion of a reaction product having desired properties, are provided. The present invention relates to such a method and an apparatus for producing a dispersion. In the method and the apparatus, a first substance is dissolved or dispersed in a first liquid, a second substance is dissolved or dispersed in a second liquid or a low dielectric liquid, a phase of the
(Continued)

second liquid and a phase of the low dielectric liquid are one on top of the other in such a manner that the two phases are separated from each other, a spray port of a nozzle is disposed in the low dielectric liquid phase, or is disposed at a position apart from the two phases but close to the low dielectric liquid phase in such a manner that the spray port is oriented to a liquid surface of the low dielectric liquid phase, and an electrode is disposed in the second liquid phase. In these states, droplets of the first liquid in which the first substance is dissolved or dispersed, are charged by generating a potential difference between the nozzle and the electrode, and are electrostatically sprayed from the spray port of the nozzle. In the method and the apparatus, the first liquid which was electrostatically sprayed, passes through the phase of the low dielectric liquid and reaches the phase of the second liquid so that the reaction product is dispersed in the second liquid phase or in the low dielectric liquid phase.

10 Claims, 5 Drawing Sheets

(51) Int. Cl.
*C08G 71/02* (2006.01)
*B22F 9/24* (2006.01)
*B01J 13/00* (2006.01)
*C08B 37/08* (2006.01)
*B22F 1/00* (2006.01)
*B01J 19/08* (2006.01)

(52) U.S. Cl.
CPC ............ *B01J 19/26* (2013.01); *B22F 1/0022* (2013.01); *B22F 9/24* (2013.01); *C08B 37/003* (2013.01); *C08G 69/28* (2013.01); *C08G 71/02* (2013.01); *B01J 2219/0803* (2013.01); *B22F 2301/255* (2013.01)

(58) Field of Classification Search
CPC .... B22F 1/0022; B22F 9/24; B22F 2301/255; C08B 37/003; C08G 69/28; C08G 71/02
USPC ......................................................... 524/832
See application file for complete search history.

(56) References Cited

FOREIGN PATENT DOCUMENTS

| | | | |
|---|---|---|---|
| JP | 2009-074224 A | 4/2009 | |
| JP | 2011-506271 A | 3/2011 | |
| JP | 2014-224337 A | 12/2014 | |
| WO | WO 2012/173262 A1 | 12/2012 | |
| WO | WO-2012173262 A1 * | 12/2012 | ............ B01F 5/0262 |

* cited by examiner

1μm

METHOD AND APPARATUS FOR PRODUCING DISPERSION

RELATED APPLICATIONS

This application is a 35 U.S.C. § 371 national phase application of PCT Application PCT/JP2015/073476 filed Aug. 21, 2015, which claims priority to Japanese Application No. 2014-174586 filed Aug. 28, 2014. The entire contents of each are incorporated herein by reference in its entirety.

FIELD OF THE INVENTION

The present invention relates to a method and to an apparatus for producing a dispersion of a reaction product obtained by reacting substances with each other.

BACKGROUND OF THE INVENTION

Polymer particles, metal particles, and the like have been used in various applications. Although the following is merely one example of the applications, polymer particles are used in fiber applications. In such applications, particles having sizes on the orders of μm and nm, are expected to exhibit new properties. Furthermore, metal particles having particle diameters on the order of nm, are called metal nanoparticles. Such metal nanoparticles have melting points dramatically lower than the melting point of the bulk substance. Accordingly, the applications of metal nanoparticles to conductive pastes and the like, which need to be melted at low temperatures, are expected, although this is merely one example of the applications. Therefore, it is required to control properties of polymer particles, metal particles, and the like according to the applications.

In addition, there are generally two types of method for producing metal nanoparticles: a breakdown method based on physical processing; and a buildup method based on chemical processing. Of these, the buildup method does not require as large dedicated machines as those for the breakdown method, and accordingly, it is widely employed. As a buildup method, a method is known in which metal ions are chemically reduced in a solvent.

In relation to this method, numerous methods for synthesizing silver nanoparticles in aqueous solutions, for example, have been studied. Typically, the Carey Lea method has been studied in which an aqueous solution of silver nitrate is added into an aqueous solution of a ferrous salt and a citric acid salt. By these methods, a liquid dispersion containing silver nanoparticles having particle diameters on the order of 10 nm, can be obtained. Such a liquid dispersion is excellent in high dispersion stability and narrow particle size distribution. Furthermore, it is known that properties of liquid dispersions of metal nanoparticles, such as a liquid dispersion of silver nanoparticles and the like, are greatly changed by controlling the particle diameters, particle diameter distribution, shapes, and the like of the metal nanoparticles.

One example of the method for producing such metal nanoparticles includes a production method in which: to control the shapes and particle diameters of silver nanoparticles (silver powder), a slurry containing an ammine complex of a silver salt and an ammine complex of a heavy metal salt acting as a habit modifier during a reduction reaction, is mixed at once with a solution containing potassium sulfite used as a reducing agent and a gelatin used as a protective colloid, the ammine complex of the silver salt is reduced so as to synthesize silver nanoparticles, and these silver nanoparticles are then recovered. (See, for example, Patent Document 1.)

In addition, in the production process of metal nanoparticles, it is necessary to suppress the self-assembly of metal nanoparticles synthesized by the reduction reaction so that the sizes of the metal nanoparticles are decreased. The measure of decreasing the sizes of metal nanoparticles includes: decreasing the concentration of a reaction solution; decreasing the volume of a reaction solution to be mixed; and the like. However, in the case of decreasing the concentration of a reaction solution, waste liquids are generated in a large amount, and a large amount of energy for the condensation is required. These bring about a problem that the environmental burden is increased. Therefore, the measure of decreasing the sizes of metal nanoparticles is preferably decreasing the volume of a reaction solution to be mixed. Furthermore, when producing metal nanoparticles, it is necessary to speed up the reduction reaction and quickly stabilize the reaction by a dispersant or the like.

Thus, as one example of the method for synthesizing a liquid dispersion of metal nanoparticles, to suppress the self-assembly and to speed up the reduction reaction, a method for synthesizing a liquid dispersion of gold nanoparticles has been proposed in which chloroauric acid ($HAuCl_4$) solution is mixed with a reducing agent (such as sodium borohydride, citric acid, ascorbic acid, or the like) by using a microreactor (micromixer) so that gold ions are reduced and gold atoms are then formed. The microreactor used in the synthesis method is configured such that liquids pass through multiple tubular flow paths and then merge for the mixing. Such a microreactor makes it possible to decrease the volume of a reaction solution to be mixed, and also makes it possible to increase the mixing speed. Accordingly, the microreactor enables highly efficient mixing and high-speed reduction reaction. In addition, adding a dispersant into the microreactor can suppress the self-assembly of the gold atoms. (See, for example, Non-Patent Document 1.)

Furthermore, another example of the synthesis method to precisely control properties of metal nanoparticles and to efficiently synthesize the metal nanoparticles includes a method for synthesizing a liquid dispersion of metal nanoparticles as follows. Specifically, while a strong electric field is generated between two electrospray nozzles which are disposed opposite to each other in air by applying positive and negative potentials, respectively, to the two electrospray nozzles, solutions of a metal salt and a reducing agent are respectively supplied to the two electrospray nozzles at constant flow rates, and droplets respectively charged to the positive and negative potentials are sprayed from the electrospray nozzles so that these droplets collide and mix with each other in air by an electrostatic interaction. (See, for example, Patent Document 2.)

PRIOR ART DOCUMENT

Patent Documents

[Patent Document 1] Japanese Patent Application Publication No. H11-106806
[Patent Document 2] International Publication No. WO2012/173262

Non-Patent Document

[Non-Patent Document 1] H. Tsunoyama, and two others, "Microfluidic Synthesis and Catalytic Application of PVP-Stabilized, ~1 nm Gold Clusters", Langmuir, (USA), 2008, Vol. 24, No. 20, pp. 11327-11330

SUMMARY OF INVENTION

Technical Problems

However, the above-described one example of the synthesis methods can only roughly control properties of metal nanoparticles, such as particle diameters, particle diameter distribution, shapes, and the like, by utilizing the properties of the chloroauric acid solution and the reducing agent, the structure of the microreactor, and so forth. Therefore, it is difficult to precisely control the properties of metal nanoparticles. As a result, it is difficult to obtain metal nanoparticles having desired properties. Since the inner diameters of tubular flow paths of microreactors are just approximately 100 μm in many cases, a reaction product adheres to inner walls of such tubular flow paths. A problem arises that the reaction product cannot be efficiently synthesized when the tubular flow paths are clogged.

Furthermore, the above-described other example of the synthesis methods has such a problem that droplets charged to the positive and negative potentials do not efficiently collide with each other because the sprayed droplets scatter in air. Furthermore, even when the droplets collide with each other, much of the reaction products made of the droplets by collision, either scatter in air or adhere to the wall surface. This results in a problem that the reaction-product recovery rate is low.

The present invention has been made in view of such circumstances. An object of the present invention is to provide a method and an apparatus for producing a dispersion, which enables high-speed and highly-efficient production of a dispersion of a reaction product having desired properties.

Solution to Problems

To achieve the above object, a method for producing a dispersion according to one aspect of the present invention is a method for producing a dispersion of a reaction product obtained by reacting first and second substances with each other, the method including an electrostatically spraying step as follows. Specifically, the first substance is dissolved or dispersed in a first liquid. The second substance is dissolved or dispersed in any one of a second liquid and a low dielectric liquid. A phase of the second liquid and a phase of the low dielectric liquid are arranged one on top the other in such a manner that the two phases are separated from each other. A spray port of a nozzle is disposed in the phase of the low dielectric liquid, or is disposed outside the phase of the low dielectric liquid and at a position apart from the two phases but close to the phase of the low dielectric liquid in such a manner that the spray port of the nozzle is oriented to a liquid surface of the phase of the low dielectric liquid. An electrode is disposed in the phase of the second liquid. Droplets of the first liquid in which the first substance is dissolved or dispersed, are electrostatically sprayed from the spray port of the nozzle, the droplets being charged by generating a potential difference between the nozzle and the electrode. In the step, the first liquid which was electrostatically sprayed, passes through the phase of the low dielectric liquid and reaches the phase of the second liquid so that the reaction product is dispersed in the phase of the second liquid or in the phase of the low dielectric liquid. Furthermore, an apparatus for producing a dispersion according to one aspect of the present invention is an apparatus for producing a dispersion of a reaction product obtained by reacting first and second substances with each other. The apparatus includes: a container configured so as to store a phase of a second liquid and a phase of a low dielectric liquid in such a state that the two phases are one on top of, and separated from, the other; a nozzle having a spray port disposed in the phase of the low dielectric liquid, or is disposed at a position apart from the two phases but close to the phase of the low dielectric liquid in such a manner that the spray port of the nozzle is oriented to a liquid surface of the phase of the low dielectric liquid; and an electrode disposed in the phase of the second liquid. In a state in which the first substance is dissolved or dispersed in a first liquid and the second substance is dissolved or dispersed in any one of the second liquid and the low dielectric liquid, droplets of the first liquid in which the first substance is dissolved or dispersed, are charged by generating a potential difference between the nozzle and the electrode, and are electrostatically sprayed from the spray port of the nozzle. The first liquid which was electrostatically sprayed, passes through the phase of the low dielectric liquid and reaches the phase of the second liquid so that the reaction product is dispersed in the phase of the second liquid or in the phase of the low dielectric liquid.

Advantageous Effects of Invention

The method and the apparatus for producing a dispersion according to the aspects of the present invention enable high-speed and highly-efficient production of a dispersion of a reaction product having desired properties.

DESCRIPTION OF EMBODIMENTS

Hereinafter, description will be given of methods and apparatuses for producing a dispersion according to First to Third Embodiments of the present invention. Note that, in the First Embodiment as will be described later, a first substance is dissolved or dispersed in a first liquid used in the production, and a second substance is dissolved or dispersed in a second liquid used in the production. In the Second Embodiment as will be described later, the first substance is dissolved or dispersed in the first liquid used in the production, and the second substance is dissolved or dispersed in a low dielectric liquid used in the production. Additionally, in the First and Second embodiments, a spray port of a nozzle configured so as to spray the first liquid, is disposed in the low dielectric liquid. In the Third Embodiment, the spray port of the nozzle configured so as to spray the first liquid, is disposed at a position apart from a phase of the low dielectric liquid and a phase of the second liquid overlapping each other, the position being close to the phase of the low dielectric liquid in such a manner that the spray port of the nozzle is oriented to a liquid surface of the phase of the low dielectric liquid.

First Embodiment

Hereinafter, description will be given of a method for producing a dispersion and an apparatus for producing a dispersion according to the First Embodiment of the present invention.

(Regarding Apparatus for Producing Dispersion)

Figure 1:
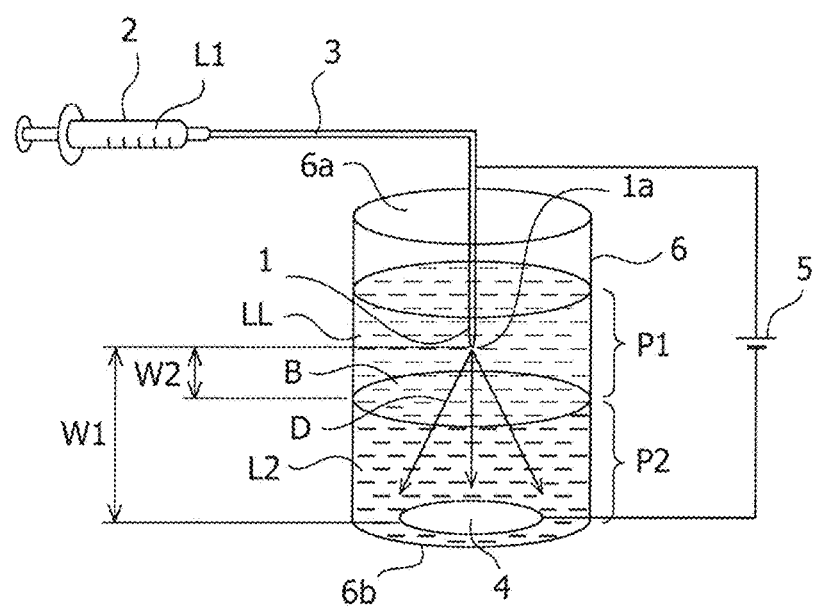
FIG. 1 is a perspective view schematically showing an apparatus for producing a dispersion according to a First Embodiment of the present invention.

First, the apparatus for producing a dispersion according to the present Embodiment will be described. As shown in FIG. 1, the production apparatus is configured so as to produce a dispersion, such as a liquid dispersion containing a reaction product between a first substance and a second substance, by using a low dielectric liquid LL, a first liquid L1, and a second liquid L2. The reaction product obtained by using the production apparatus is: metal particles, fiber particles, resin particles, organic crystals, semiconductor particles, oligomer particles, polymer particles, or the like; in particular, metal nanoparticles, fiber nanoparticles, resin nanoparticles, organic nanocrystals, semiconductor nanoparticles, oligomer nanoparticles, polymer nanoparticles, or the like. The production apparatus is configured so as to produce dispersions, such as liquid dispersions of these reaction products, or the like. A first substance is dissolved or dispersed in the first liquid L1 used in the production. In particular, the first substance is preferably dissolved in the first liquid L1. A second substance is dissolved or dispersed in the second liquid L2 used in the production. In particular, the second substance is preferably dissolved in the second liquid L2. These first and second liquids L1, L2 are preferably miscible with each other.

The production apparatus has an electrospray nozzle (hereinafter referred to as "nozzle") 1 which is configured so as to be capable of electrostatically spraying the first liquid L1. The first liquid L1 is sprayed from a spray port 1a of the nozzle 1 as indicated by arrows D, in the form of droplets. Furthermore, the production apparatus has a supply source 2 configured so as to supply the first liquid LL. The nozzle 1 is connected to the supply source 2 through a supply pipe 3.

The production apparatus has an electrode 4 disposed apart from the spray port 1a of the nozzle 1. In FIG. 1, the electrode 4 faces the spray port 1a of the nozzle 1 with a space at a distance W1. The distance W1 is associated with an electric field strength, and is further associated with the fragmentation process of droplets formed by the electrostatical spraying. Therefore, it is preferable to optimize the distance W1. The electrode 4 is formed in a substantially plate shape. Nevertheless, the present invention is not limited to this, and the shape of the electrode 4 may be a substantially ring shape, a substantially cylindrical shape, a substantially mesh shape, a substantially rod shape, a substantially spherical shape, a substantially hemispherical shape, or other similar shapes, as long as it is possible to form an electrostatic field between the nozzle 1 and the electrode 4 as will be described later. As an example, the spray port 1a of the nozzle 1 is preferably oriented in such a manner as to spray the first liquid L1 in a direction perpendicular to a flat surface of the plate-shaped electrode 4.

The production apparatus has a power source 5 electrically connected to each of the nozzle 1 and the electrode 4. In particular, the power source 5 is preferably a high-voltage power source. The power source 5 is configured so as to apply a positive potential to the nozzle 1 and apply a negative potential to the electrode 4. Nevertheless, the present invention is not limited to this, and the power source 5 may be configured so as to apply a negative potential to the nozzle 1 and apply a positive potential to the electrode 4.

The production apparatus includes a container 6 having a cavity formed therein. The container 6 is configured so as to be capable of hermetically sealing the inside. Nevertheless, the present invention is not limited to this, and the container 6 may be configured so as to open upward. The container 6 is configured so as to store the low dielectric liquid LL and the second liquid L2 therein. A phase P1 made of the low dielectric liquid LL (hereinafter referred to as "low dielectric liquid phase") is arranged at a top portion 6a side of the container 6, while a phase P2 made of the second liquid L2 (hereinafter referred to as "second liquid phase") is arranged at a bottom portion 6b side of the container 6. The low dielectric liquid phase P1 and the second liquid phase P2 are one on top of the other while being separated from each other with an interface B serving as a border therebetween. In this case, the low dielectric liquid phase P1 is located as an upper layer, and the second liquid phase P2 is located as a lower layer.

In such a production apparatus, the spray port 1a of the nozzle 1 is disposed apart from the interface B with a space at a distance W2 in the low dielectric liquid phase P1. The distance W2 is associated with an electric field strength, and further is associated with the fragmentation process of droplets formed by the electrostatical spraying. Therefore, it is preferable to optimize the distance W2. Furthermore, the electrode 4 is disposed in the second liquid phase P2. In FIG. 1, the electrode 4 is disposed to be in contact with the bottom portion 6b of the container 6. Nevertheless, the present invention is not limited to this. For example, the electrode 4 may be disposed apart from the bottom portion 6b of the container 6 with a space. In the case in which the electrode 4 is formed in a substantially ring shape or a substantially cylindrical shape, the electrode 4 may be disposed in a circumferential direction of the container 6.

In FIG. 1, the production apparatus is disposed such that the top portion 6a side of the container 6 faces upward and the bottom portion 6b side thereof faces downward. Nevertheless, the present invention is not limited to this, and the production apparatus may be disposed such that the bottom portion 6b side of the container 6 faces upward and the top portion 6a side thereof faces downward. In this case, the second liquid phase P2 needs to be located as the upper layer, while the low dielectric liquid phase P1 needs to be located as the lower layer. Accordingly, a solvent, for example, carbon tetrachloride, perfluorohexane, or the like, having a higher relative density than the second liquid L2, should be used as the low dielectric liquid LL. In the case in which the low dielectric liquid phase P1 is located as the upper layer while the second liquid phase P2 is located as the lower layer, a gas generated in the second liquid phase by the reaction between the first and second substances, is elevated in a state of a foam containing the second liquid, while this gas passes through the low dielectric liquid phase. Electricity passes between the spray port of the nozzle and the second liquid phase through the second liquid contained in this foam. As a result, a potential difference between the nozzle and the electrode might be lost. In contrast, in the case in which the second liquid phase P2 is located as the upper layer while the low dielectric liquid phase P1 is located as the lower layer, since the gas generated in the second liquid phase P2 is elevated, it is hard for the gas to move to the low dielectric liquid phase P1 which is located as the lower layer. This makes it possible to prevent electricity from passing between the spray port 1a of the nozzle 1 and the second liquid phase P2 through the gas generated as described above, and also prevent the loss of the potential difference between the nozzle 1 and the electrode 4.

(Regarding Method for Producing Dispersion)

The method for producing a dispersion according to the present Embodiment will be described. The first substance is dissolved or dispersed in the first liquid L1, and the second substance is dissolved or dispersed in the second liquid L2. In particular, preferably, the first substance is dissolved in the first liquid L1, and the second substance is dissolved in the second liquid L2. Inside the container 6, the low dielectric liquid phase LL and the second liquid phase P2 are arranged one on top of the other in such a manner that the two phases are separated from each other. The spray port 1a of the nozzle 1 is disposed in the low dielectric liquid phase P1, and the electrode 4 is disposed in the second liquid phase P2. The power source 5 applies a positive potential to the nozzle 1 and applies a negative potential to the electrode 4, thereby generating a potential difference between the nozzle 1 and the electrode 4. In this event, an electrostatic field is formed between the nozzle 1 and the electrode 4. Note that the power source 5 may apply a negative potential to the nozzle 1 and apply a positive potential to the electrode 4 to thereby generate a potential difference between the nozzle 1 and the electrode 4.

In such a state, the first liquid L1 is sprayed in the form of droplets from the spray port 1a of the nozzle 1 in the low dielectric liquid phase P1. The droplets have been in a charged state. Such droplets move through the low dielectric liquid phase P1 toward the second liquid phase P2 according to an electric field gradient, and reach the interface B between the low dielectric liquid phase P1 and the second liquid phase P2. Here, it is favorable to control the droplet sizes by adjusting at least one of: the type of the low dielectric liquid LL, the surface tension of the first liquid L1, ionic strength of the first liquid L1, and relative permittivity of the first liquid L1, and the potential difference between the nozzle 1 and the electrode 4.

Next, since the droplets of the first liquid L1 and the second liquid are preferably miscible with each other, the droplets of the first liquid L1 mix and react with the second liquid L2. Furthermore, the first substance dissolved or dispersed in the first liquid L1 reacts with the second substance dissolved or dispersed in the second liquid L2, and the reaction product between the first and second substances is dispersed in the second liquid phase P2. As a result, a liquid dispersion of the reaction product is obtained. The second liquid phase P2 is then separated from the low dielectric liquid phase P1, and the reaction product can also be recovered from the liquid dispersion obtained in the second liquid phase P2. As an example, the second liquid phase P2 is extracted from the container 6, and the liquid dispersion obtained in the second liquid phase P2 is centrifuged to fractionate the reaction product. The reaction product thus fractionated may be recovered.

Examples of the reaction product obtained by such a production method include metal particles, fiber particles, resin particles, organic crystals, semiconductor particles, oligomer particles, polymer particles, and the like; in particular, metal nanoparticles, fiber nanoparticles, resin nanoparticles, organic nanocrystals, semiconductor nanoparticles, oligomer nanoparticles, polymer nanoparticles, and the like.

Furthermore, preferable configurations of the present Embodiment will be described.

(Regarding Raw Material Substances)

One of the first and second substances is favorably a raw material substance of the reaction product. The raw material substance is favorably, for example, a naturally-occurring polysaccharide such as cellulose, guar gum, carrageenan, gum arabic, xanthan gum, and chitosan or derivatives thereof (such as acetylcellulose); polyvinyl alcohol, polyvinyl alcohol, polyacrylnitrile, polyacrylic acid, polyvinylidene fluoride, polyethylene oxide, polyester, a metal salt, or the like, or a mixture of two or more thereof. When the raw material substance is dissolved or dispersed in the first or second liquid L1, L2, the concentration of the raw material substance is favorably within a range of 2% by mass to 30% by mass, both inclusive. The concentration is further preferably within a range of 5% by mass to 20% by mass, both inclusive.

In the case of producing a liquid dispersion of metal nanoparticles, the raw material substance is a metal salt. The metal salt is favorably, for example, a salt of or a double salt of platinum, gold, silver, copper, tin, nickel, iron, palladium, zinc, iron, cobalt, tungsten, ruthenium, indium, molybdenum, or the like, a complex compound thereof, or the like, or a mixture of two or more thereof. The salt is favorably a nitrate, a sulfate, a chloride, or the like.

In particular, in the case in which the first substance as the raw material substance is a metal salt, in order to decrease the surface tension of droplets sprayed from the nozzle 1, the first liquid L1 may contain a lower alcohol having 1 to 3 carbon atoms such as methanol, ethanol, or isopropyl alcohol; a ketone such as acetone or methyl ethyl ketone; or a mixture of two or more thereof. Furthermore, the concentration of the metal salt in the first liquid L1 or in the second liquid L2 can be adjusted as appropriate in accordance with the solubility of the compound from which the metal ions are derived, the usage of the liquid dispersion of metal nanoparticles, and so forth. For example, the concentration of the metal salt is preferably within a range of 0.01 mol/L to 5 mol/L, both inclusive.

(Regarding Reducing Agent)

When a liquid dispersion of metal nanoparticles is produced, the other of the first and second substances is favorably a reducing agent. As such a reducing agent, an optimal reducing agent is favorably selected which is suited for the metal ion species to be reduced. The reducing agent is favorably, for example, hydroxymethanesulfinic acid, thioglycolic acid, sulfurous acid, or a salt thereof such as a sodium salt, a potassium salt, or an ammonium salt thereof, ascorbic acid, citric acid, sodium hydrosulfite, thiourea, dithiothreitol, a hydrazine, a formaldehyde, a boron hydride, or a mixture of two or more thereof.

The hydrazine is favorably, for example, hydrazine, a hydrazine hydrate, a hydrazine salt, a hydrazine substituent derivative or a salt thereof, or the like. Specific examples thereof include hydrazine hydrates, hydrazine monohydrochloride, hydrazine dihydrochloride, hydrazine sulfate, hydrazine bromate, hydrazine carbonate, methylhydrazine, phenylhydrazinc, tert-butylhydrazine hydrochloride, carbohydrazide, and the like.

The formaldehyde is favorably, for example, formaldehyde, paraformaldehyde, or the like, or a mixture of two or more thereof. The boron hydride refers to a reducing compound having a boron-hydrogen bond. Specific examples thereof include sodium borohydride, potassium borohydride, lithium borohydride, sodium cyanotrihydroborate, lithium triethylborohydride, tetrahydrofuran-borane complex, dimethylamine-borane complex, diphenylamine-borane complex, pyridine-borane complex, and the like. In particular, the reducing agent is preferably ascorbic acid or a hydrazine.

Additionally, when a liquid dispersion of metal nanoparticles is produced, the amount of the reducing agent added can be adjusted as appropriate in accordance with the type of the reducing agent, the concentration of the metal salt in the first liquid L1 or in the second liquid L2, and so forth. For example, the amount of the reducing agent added is preferably within a range of 1 to 2 chemical equivalents (stoichiometric amounts, stoichiometries). If the amount of the reducing agent added is less than the chemical equivalent(s), the reduction reaction for the metal ions may not proceed sufficiently. On the other hand, even if the amount of the reducing agent added exceeds 2 chemical equivalents, there will be no problems, but the cost is high.

(Regarding Low Dielectric Liquid LL)

Hereinafter, description will be given of preferable configurations of the low dielectric liquid LL. The low dielectric liquid LL is favorably an organic solvent system not miscible with the first and second liquids L1, L2. Furthermore, the low dielectric liquid LL is preferably a non-aqueous organic solvent. The relative permittivity of the low dielectric liquid LL is favorably 25 or less, preferably 20 or less, more preferably 15 or less, further preferably 10 or less, and still further preferably 5 or less. For example, the low dielectric liquid LL is favorably a normal paraffin-based hydrocarbon such as hexane, heptane, octane, nonane, decane, or dodecane; an isoparaffin-based hydrocarbon such as isooctane, isodecane, or isododecane; a cycloparaffin-based hydrocarbon such as cyclohexane, cyclooctane, cyclodecane, or decalin; a hydrocarbon solvent such as liquid paraffin or kerosene; an aromatic solvent such as benzene, toluene, or xylene; a chlorine-based solvent such as chloroform or carbon tetrachloride; a fluorine-based solvent such as perfluorocarbon, perfluoropolyether, or hydrofluoroether; an alcohol solvent such as 1-butanol (relative permittivity: 17.51), 1-pentanol (relative permittivity: 13.90), 1-octanol (relative permittivity: 10.30); and a mixture of two or more thereof. For example, the isoparaffin is favorably IP Solvent 1016 or IP Clean LX(registered trademark) manufactured by Idemitsu Kosan Co., Ltd., Marukasol R manufactured by Maruzen Petrochemical Co., Ltd., Isopar H(registered trademark), Isopar E(registered trademark), or Isopar L(registered trademark) manufactured by ExxonMobil Corporation, or the like. Additionally, the relative permittivity of the low dielectric liquid LL is preferably lower than the relative permittivities of the first and second liquids L1, L2.

(Regarding First and Second Liquids L1, L2)

Hereinafter, description will be given of preferable configurations of the first and second liquids L1, L2. The first and second liquids L1, L2 are favorably aqueous or aqueous solution systems miscible with each other. For example, solvents used in the first and second liquids L1, L2 are favorably water, ethanol, DMF, acetone, or a mixture of two or more thereof. In particular, the first and second liquids L1, L2 is favorably water, or is an aqueous solution of water with an aqueous solvent such as ethanol, DMF, or acetone. In addition, the solvents used in the first and second liquids L1, L2 are preferably the same type.

(Regarding Dispersant)

In the second liquid L2, a dispersant is dissolved or dispersed favorably as an auxiliary agent. In particular, favorably, water is used as the second liquid L2, and an aqueous solution or the like obtained by dissolving or dispersing a dispersant in the water is used. Note that it is also possible to dissolve or disperse a dispersant as an auxiliary agent in the low dielectric liquid LL. Furthermore, to decrease the interface tension and the solvent viscosity, the second liquid L2 may be mixed with a lower alcohol having 1 to 3 carbon atoms such as methanol, ethanol, or isopropyl alcohol; a glycol ether solvent thereof; or a mixture of two or more thereof.

As the dispersant, a surfactant can be used. In particular, when a liquid dispersion of metal nanoparticles is produced, a surfactant is preferably used as the dispersant. Dispersant components may be, for example, a polymer stabilizer such as gum arabic, polyvinyl alcohol, polyvinylpyrrolidone, a cellulose derivative, an acrylic acid polymer and a copolymer thereof, a maleic anhydride copolymer, a styrene maleic anhydride copolymer, an isobutylene maleic anhydride copolymer, polyacrylamide, 2-acrylamido-2-methyl-propanesulfonic acid polymer or a copolymer thereof, or the like, or a mixture of two or more thereof. In particular, when a liquid dispersion of metal nanoparticles is produced, these are preferably used in combination with a surfactant.

The surfactant is favorably a nonionic surfactant, an anionic surfactant, a cationic surfactant, an amphoteric surfactant, or the like.

The anionic surfactant is favorably, for example, one having a sulfone group such as an α-olefinsulfonic acid salt, an alkylbenzenesulfonic acid salt, a paraffin sulfonic acid salt, an α-sulfo fatty acid salt, or an α-sulfo fatty acid alkyl ester salt; one having a sulfuric acid ester group such as a higher alcohol sulfuric acid ester salt or a polyoxyethylene alkyl (or alkenyl) ether sulfuric acid ester salt; or a mixture of two or more thereof.

The cationic surfactant is favorably, for example, a monoalkyltrimethylammonium salt, a dialkyldimethylammonium salt, a monoalkylamine acetic acid salt, a dialkylamine acetic acid salt, an alkylimidazoline quaternary salt, or the like, or a mixture of two or more thereof. Note that the number of carbon atoms of each alkyl group is preferably 8 to 24.

The amphoteric surfactant is favorably, for example, an alkyl betaine, a fatty acid amide propyl betaine, a 2-alkyl-N-carboxymethyl-N-hydroxyethylimidazolinium betaine, an alkyldiethylenetriaminoacetic acid, a dialkyldiethylenetriaminoacetic acid, an alkylamine oxide, or the like, or a mixture of two or more thereof.

In particular, a nonionic surfactant is preferably used as the surfactant from the viewpoint that it is possible to stabilize a liquid dispersion of metal nanoparticles. The nonionic surfactant is favorably: a fatty acid ester of an alcohol or of an alkylene oxide adduct of an alcohol; a fatty acid ester of a phenol or of an alkylene oxide adduct of a phenol; an alkylene oxide adduct of a phenol or of an alcohol having 8 to 24 carbon atoms; a polymer of ethylene oxide and/or propylene oxide (pluronic type nonionic surfactant); an alkylene oxide adduct of an alkylamine; an alkylene oxide adduct of a fatty acid amide; a fatty acid amide of an alkanolamine; or the like; or a mixture of two or more thereof.

Furthermore, from the viewpoint that it is possible to further stabilize a liquid dispersion of metal nanoparticles, the nonionic surfactant is favorably: a fatty acid ester of an alcohol or of an alkylene oxide adduct of an alcohol; a fatty acid ester of a phenol or of an alkylene oxide adduct of a phenol; an alkylene oxide adduct of a phenol or of an alcohol having 8 to 24 carbon atoms; or a mixture of two or more thereof. In particular, the nonionic surfactant is preferably a nonionic surfactant made of a fatty acid ester of an alcohol or of an alkylene oxide adduct of an alcohol, or a fatty acid ester of a phenol or of an alkylene oxide adduct of a phenol. Alternatively, the nonionic surfactant is preferably made of at least two or more thereof. Furthermore, the nonionic surfactant is more preferably a fatty acid ester of an alcohol or of an alkylene oxide adduct of an alcohol.

Note that the phenols each refer to an aromatic ring bonded to a hydroxy group. Examples of the phenols include phenol, mono-, di-, or tristyrenated phenols, alkylphenols, mono-, di-, or tristyrenated alkylphenols, and the like. The number of carbon atoms of the alkyl groups can be 1 to 12, and the number of bonds to the aromatic ring can be 1 to 3.

The alkylene oxides are each favorably an alkylene oxide having 2 to 3 carbon atoms. In particular, from the viewpoint that it is possible to further stabilize a liquid dispersion of metal nanoparticles, the alkylene oxides are preferably an ethylene oxide or a propylene oxide.

As an example, the alcohols in the fatty acid ester of an alcohol or of an alkylene oxide adduct of an alcohol may be each an alcohol having 1 to 24 carbon atoms and having 1 to 6 hydroxyl groups. From the viewpoint that it is possible to further stabilize a liquid dispersion of metal nanoparticles, these alcohols are each preferably an alcohol having 3 to 12 carbon atoms and having 2 to 6 hydroxyl groups. Furthermore, these alcohols more preferably have 3 to 6 carbon atoms.

Examples of the alcohols include sorbitan, sugar alcohols, sugars, and the like. Among these, examples of the sugar alcohols include glycerin, erythritol, threitol, arabitol, xylitol, pentaerythritol, ribitol, iditol, dulcitol, sorbitol, mannitol, and the like. Furthermore, examples of the sugars include monosaccharides such as glucose, erythrose, arabinose, mannose, galactose, and fructose; disaccharides such as sucrose and trehalose; and the like. From the viewpoint that it is possible to further stabilize a liquid dispersion of metal nanoparticles, such an alcohol is favorably sorbitan, glycerin, pentaerythritol, sorbitol, or sucrose. The alcohol is further preferably sorbitan, glycerin, or sorbitol.

The fatty acid is favorably, for example, a fatty acid having 8 to 22 carbon atoms. In particular, from the viewpoint that it is possible to further stabilize a liquid dispersion of metal nanoparticles, the fatty acid is preferably a fatty acid having 12 to 18 carbon atoms. Such a fatty acid is favorably dodecanoic acid, tetradecanoic acid, pentadecanoic acid, hexadecanoic acid, hexadecenoic acid, heptadecanoic acid, octadecanoic acid, octadecenoic acid, octadecadienoic acid, octadecanetrienoic acid, or the like. Furthermore, from the viewpoint that it is possible to further stabilize a liquid dispersion of metal nanoparticles, the average number of moles of added alkylene oxide is preferably 5 moles to 100 moles in the ethylene oxide, and 0 moles to 10 moles in the propylene oxide.

The fatty acid ester of an alcohol or of an alkylene oxide adduct of an alcohol may be a naturally occurring oil and fat, a hydrogenated oil or semihydrogenated oil thereof, or an alkylene oxide adduct of these. The oil and fat is favorably castor oil, peanut oil, olive oil, rapeseed oil, coconut oil, palm oil, palm kernel oil, beef tallow, mutton tallow, or the like. In particular, from the viewpoint that it is possible to further stabilize a liquid dispersion of metal nanoparticles, the oil and fat is preferably castor oil.

From the viewpoint that it is possible to further stabilize a liquid dispersion of metal nanoparticles, the phenol in the alkylene oxide adduct of a phenol is preferably tristyrenated phenol. Furthermore, from the viewpoint that it is possible to further stabilize a liquid dispersion of metal nanoparticles, the average number of moles of added alkylene oxide is preferably 5 moles to 40 moles in the ethylene oxide, and 0 moles to 10 moles in the propylene oxide. From the viewpoint that it is possible to further stabilize a liquid dispersion of metal nanoparticles, the alcohol in the alkylene oxide adduct of an alcohol having 8 to 24 carbon atoms is preferably an aliphatic alcohol having 12 to 22 carbon atoms. From the viewpoint that it is possible to further stabilize a liquid dispersion of metal nanoparticles, the number of moles of added alkylene oxide is further preferably 1 mole to 30 moles in the ethylene oxide, and 0 moles to 5 moles in the propylene oxide.

Additionally, one type of the nonionic surfactant may be used alone, or two or more types thereof may be used in combination. In particular, from the viewpoint that it is possible to further stabilize a liquid dispersion of metal nanoparticles, two or more types of the nonionic surfactant are preferably used in combination. As an example, the combination of nonionic surfactants used together preferably include a fatty acid ester of an alcohol or of an alkylene oxide adduct of an alcohol, and an alkylene oxide adduct of a phenol or of an alcohol having 8 to 24 carbon atoms.

In addition, the concentration of the nonionic surfactant dissolved or dispersed in the second liquid L2 can be adjusted as appropriate in accordance with the usage of the liquid dispersion of metal nanoparticles, and so forth. For example, when the nonionic surfactant is dissolved or dispersed in the second liquid L2, the concentration of the nonionic surfactant is favorably within a range of 0.1% by mass to 10% by mass, both inclusive. The concentration is further preferably within a range of 0.1% by mass to 5% by mass, both inclusive.

(Regarding Controlling of Reaction Product)

In the present Embodiment, it is possible to control the shape of the reaction product so that the reaction product can have a fiber shape, a spherical shape, a hollow (bolus) shape, or other similar shapes, control the reaction product to form a composite, or control the size of the reaction product, by adjusting the potential difference between the nozzle 1 and the electrode 4, the concentrations of the substances dissolved or dispersed in the first and second liquids L1, L2 and associated with the reaction, the chemical interaction between the low dielectric liquid LL and the first liquid L1, and so forth. In particular, when a liquid dispersion of metal nanoparticles is produced, the sizes of the metal nanoparticles synthesized by the reduction reaction depend on the sizes of the droplets of the first liquid L1, the speed at which the droplets scatter in the second liquid phase P2, and the speed of the reduction reaction. By taking into consideration that the size of the reaction product is to be decreased, in particular, that the sizes of the metal nanoparticles are on the order of nm, the droplets favorably have an average particle diameter within a range of 0.1 μm to 100 μm, both inclusive. The average particle diameter is further preferably within a range of 1 μm to 10 μm, both inclusive.

Accordingly, the type of the low dielectric liquid LL, the type of the solvents in the first and second liquids L1, L2, the amount of the droplets sprayed from the nozzle 1 (i.e., the speed of feeding the first liquid L1 from the supply source 2 toward the nozzle 1), the type of the reducing agent, the distance W1 between the spray port 1a of the nozzle 1 and the electrode 4, the distance W2 between the spray port 1a of the nozzle 1 and the interface B, the potential difference between the nozzle 1 and the electrode 4, and so forth, are adjusted. These adjustments make it possible to control the droplet sizes, and thereby control the size of the reaction product, in particular, metal nanoparticles. For example, the size of the reaction product such as metal nanoparticles can be controlled by controlling the droplet sizes through adjustment of at least one of: properties of the low dielectric liquid LL such as relative permittivity and viscosity, properties of the first liquid L1 such as surface tension, viscosity, relative permittivity, and ionic strength, and the potential difference between the nozzle 1 and the electrode 4.

Note that increasing the surface tension of the first liquid L1 can increase the droplet sizes. Increasing the ionic strength of the first liquid L1 can increase the droplet sizes. Increasing the relative permittivity of the first liquid L1 can increase the droplet sizes. Increasing the droplet sizes in these ways makes it possible to increase the size of the reaction product such as metal nanoparticles. Meanwhile, increasing the potential difference between the nozzle 1 and the electrode 4 can decrease the droplet sizes. Decreasing the droplet sizes in this may makes it possible to decrease the size of the reaction product such as metal nanoparticles.

The distance W1 between the spray port 1*a* of the nozzle 1 and the electrode 4 is favorably 1 cm or more. The distance W1 is further preferably 2 cm or more. The distance W2 between the spray port 1*a* of the nozzle 1 and the interface B can be adjusted as appropriate with the container capacity, the potential difference, and so forth. The distance W2 is preferably 1 cm or more, more preferably 2 cm or more, as long as the value is smaller than the distance W1. The upper limit of the distance W2 can be 20 cm by adjusting the potential, for example, in a case in which a beaker has a capacity of 10 L. The upper limit can be adjusted as appropriate in accordance with the container capacity, the potential difference, and so forth.

The potential at the nozzle 1 side is favorably within a range of −30 kV to 30 kV, both inclusive, and the potential at the electrode 4 side is also favorably within the range of −30 kV to 30 kV both inclusive. The potential difference between the nozzle 1 and the electrode 4 is favorably adjusted such that it is adequate for the reaction product to be obtained. For example, the potential difference between the nozzle 1 and the electrode 4 is favorably within a range of 0.3 kV to 30 kV both inclusive when expressed as absolute values. Furthermore, by taking the stability of the reaction product and so forth into consideration, the potential difference between the nozzle 1 and the electrode 4 is preferably 2.5 kV or more when expressed as absolute values. By taking the safety and cost of the apparatus into consideration also, the potential difference is preferably 10 kV or less when expressed as absolute values. The amount of the droplets sprayed from the nozzle 1 is favorably selected such that it is adequate for the reaction amount. For example, if the reaction amount is 100 mL, the sprayed amount is favorably regulated such that the speed of feeding the first liquid L1 is within a range of 0.001 mL/min (minute) to 0.1 mL/min, both inclusive.

When a liquid dispersion of metal nanoparticles is produced, the liquid dispersion of metal nanoparticles can be subjected, as necessary, to various separation processes to reduce the amount of an excessive amount of the additive, and can also be subjected to condensation operation. As an ordinary process for the additive reduction and by-product salt removal, it is possible to employ centrifugation, ultrafiltration, ion exchange resin/membrane, or the like. The liquid dispersion of metal nanoparticles thus obtained can be diluted or condensed to a predetermined concentration, and can be adjusted in accordance with the usage. Furthermore, the liquid dispersion of metal nanoparticles may contain other additives selected from a polymer resin dispersant, a pigment, a plasticizer, a stabilizer, an antioxidant, and the like, and a mixture of two or more thereof, depending on the purpose.

As described above, in the production method and the production apparatus according to the present Embodiment, the first liquid L1 in which the first substance is dissolved or dispersed is electrostatically sprayed into the low dielectric liquid phase P1. The first liquid L1 thus electrostatically sprayed passes through the low dielectric liquid phase P1, and reaches the second liquid phase P2 in which the second substance is dissolved or dispersed. Thereby, the reaction product between the first and second substances is dispersed in the second liquid phase. Therefore, almost all of the first substance dissolved or dispersed in the electrostatically-sprayed first liquid L1 can react with the second substance dissolved or be dispersed in the second liquid L2. In addition, at least one of the electrostatic field, and the properties of the low dielectric liquid LL, the first liquid L1, and the second liquid L2 is adjusted to control the properties of the droplets such that they are adequate for the reaction between the first and second substances. Thus, it is possible to quickly stabilize the reaction product having desired properties, and to highly efficiently produce a dispersion of the reaction product. This enables high-speed and highly-efficient production of a dispersion of the reaction product having desired properties.

In the production method and the production apparatus according to the present Embodiment, the droplet sizes are controlled by adjusting at least one of: the type of the low dielectric liquid LL, the surface tension of the first liquid L1, ionic strength of the first liquid L1, and relative permittivity of the first liquid L1, and the potential difference between the nozzle 1 and the electrode 4. Therefore, precisely controlling the droplet sizes enables such controlling that the droplets are adequate for the reaction between the first and second substances. Furthermore, since the size of the reaction product is changed by the droplet sizes, precisely controlling the droplet sizes makes it possible to obtain a reaction product having a desired size.

The production method and the production apparatus according to the present Embodiment enable high-speed and highly-efficient production of a dispersion of metal nanoparticles having desired properties in the second liquid phase P2, when one of the first and second substances is a metal salt, the other of the first and second substances is a reducing agent, and a surfactant is further dissolved or dispersed in the second liquid. Furthermore, when such a liquid dispersion of metal nanoparticles is produced, the surfactant is preferably a nonionic surfactant. In this case, the liquid dispersion of metal nanoparticles can be easily stabilized, and furthermore the liquid dispersion of metal nanoparticles can be easily condensed.

Second Embodiment

Hereinafter, description will be given of a method and an apparatus for producing a dispersion according to the Second Embodiment of the present invention.

(Regarding Apparatus for Producing Dispersion)

The basic configuration of the apparatus for producing a dispersion according to the present Embodiment is the same as that of the production apparatus according to the First embodiment. The production apparatus is configured so as to produce a dispersion, such as a liquid dispersion containing a reaction product between a first substance and a second substance, by using the low dielectric liquid LL, the first liquid L, and the second liquid L2. However, the production apparatus according to the present Embodiment differs from the production apparatus according to the First Embodiment as follows.

The reaction product obtained by using the production apparatus according to the present Embodiment is: fiber particles, resin particles, organic crystals, semiconductor particles, oligomer particles, polymer particles, or the like; in particular, fiber nanoparticles, resin nanoparticles, organic nanocrystals, semiconductor nanoparticles, oligomer nanoparticles, polymer nanoparticles, or the like. The production apparatus is configured so as to produce dispersions such as liquid dispersions of such reaction products. Additionally, a first substance is dissolved or dispersed in the first liquid L1 used in the production. In particular, the first substance is preferably dissolved in the first liquid L1. A second substance is dissolved or dispersed in the low dielectric liquid LL used in the production. In particular, the second substance is preferably dissolved in the low dielectric liquid LL.

(Regarding Method for Producing Dispersion)

The method for producing a dispersion according to the present Embodiment will be described. The first substance is dissolved or dispersed in the first liquid L1, and the second substance is dissolved or dispersed in the low dielectric liquid LL. In particular, preferably, the first substance is dissolved in the first liquid L1, and the second substance is dissolved in the low dielectric liquid LL. Inside the container 6, the low dielectric liquid phase LL and the second liquid phase P2 are arranged one on top of the other in such a manner that the two phases are separated from each other. The spray port 1a of the nozzle 1 is disposed in the low dielectric liquid phase P1, and the electrode 4 is disposed in the second liquid phase P2. The power source 5 applies a positive potential to the nozzle 1 and applies a negative potential to the electrode 4, thereby generating a potential difference between the nozzle 1 and the electrode 4. In this event, an electrostatic field is formed between the nozzle 1 and the electrode 4. Note that the power source 5 may apply a negative potential to the nozzle 1 and apply a positive potential to the electrode 4 to thereby generate a potential difference between the nozzle 1 and the electrode 4.

In such a state, the first liquid L1 is sprayed in the form of droplets from the spray port 1a of the nozzle 1 in the low dielectric liquid phase P1. The droplets have been in a charged state. Such droplets move through the low dielectric liquid phase P1 toward the second liquid phase P2 according to an electric field gradient, and reach the interface B between the low dielectric liquid phase P1 and the second liquid phase P2. Here, it is favorable to control the droplet sizes by adjusting at least one of: the type of the low dielectric liquid LL, the surface tension of the first liquid L1, ionic strength of the first liquid L1, and relative permittivity of the first liquid L1, and the potential difference between the nozzle 1 and the electrode 4. Next, a reaction product is synthesized when the droplets pass through the low dielectric liquid phase P1. Here, conceivable are a case in which the reaction product stays in the low dielectric liquid phase P1 and disperses in the low dielectric liquid phase P1, and a case in which the reaction product moves to the second liquid phase P2 and disperses in the second liquid phase P2.

The case in which the reaction product stays in the low dielectric liquid phase P1 and disperses in the low dielectric liquid phase P1 will be described. When the droplets pass through the low dielectric liquid phase P1, the first and second substances react with each other, and the reaction product between the first and second substances is synthesized in the low dielectric liquid phase P1, so that a liquid dispersion of the reaction product is obtained in the low dielectric liquid phase P1. The low dielectric liquid phase P1 is then separated from the second liquid phase P2, and the reaction product can also be recovered from the liquid dispersion obtained in the low dielectric liquid phase P1. As an example, the low dielectric liquid phase P1 is extracted from the container 6, and the liquid dispersion obtained in the low dielectric liquid phase P1 is centrifuged to fractionate the reaction product. The reaction product thus fractionated may be recovered.

The case in which the reaction product moves to the second liquid phase P2 and disperses in the second liquid phase P2 will be described. The reaction product synthesized when passing through the low dielectric liquid phase P1, moves to the second liquid phase P2. Such a reaction product is dispersed in the second liquid phase P2. As a result, a liquid dispersion of the reaction product is obtained. The second liquid phase P2 is then separated from the low dielectric liquid phase P1, and the reaction product can also be recovered from the liquid dispersion obtained in the second liquid phase P2. As an example, the second liquid phase P2 is extracted from the container 6, and the liquid dispersion obtained in the second liquid phase P2 is centrifuged to fractionate the reaction product. The reaction product thus fractionated may be recovered.

Examples of the reaction product obtained by such a production method include fiber particles, resin particles, organic crystals, semiconductor particles, oligomer particles, polymer particles, and the like; in particular, fiber nanoparticles, resin nanoparticles, organic nanocrystals, semiconductor nanoparticles, oligomer nanoparticles, polymer nanoparticles, and the like.

Furthermore, preferable configurations of the present Embodiment will be further described.

(Regarding Raw Material Substances)

Raw material substances of the reaction product will be described. In cases of producing liquid dispersions of a polyamide and a polyurea among polymers, one of the first and second substances is a first monomer, while the other of the first and second substances is a second monomer. Specifically, the first and second substances are the raw material substances. Note that, as the first or second monomer, which serves as the second substance, one soluble in the low dielectric liquid LL is used. Here, in the case in which a liquid dispersion of a polyamide is produced, the first monomer is favorably a dicarboxylic acid or dicarboxylic acid dihalide such as adipic acid, adipoyl dichloride, sebacic acid, sebacoyl chloride, terephthalic acid, terephthaloyl dichloride, isophthalic acid, isophthaloyl chloride (preferably, dicarboxylic acid dichloride), or the like. Meanwhile, the second monomer is favorably an alkanediamine such as methanediamine, ethanediamine, butanediamine, hexanediamine, octanediamine, nonanediamine, or decanediamine; or a diamine such as p-phenylenediamine or m-phenylenediamine. Additionally, in the case in which a liquid dispersion of a polyurea is produced, the first monomer is favorably an isocyanate such as methylenebis(4,1-phenylene)

diisocyanate or hexamethylene diisocyanate, or the like. Meanwhile, the second monomer is favorably a diamine as described above.

In a case of producing a liquid dispersion of a polymer obtained by radical polymerization, one of the first and second substances is a monomer, while the other of the first and second substances is a polymerization initiator. Specifically, one of the first and second substances is a raw material substance. Note that, as the monomer or the polymerization initiator, which serves as the second substance, one soluble in the low dielectric liquid LL is used. In this case, the monomer is favorably acrylic acid, methacrylic acid, an ester thereof, a styrene, or the like. Meanwhile, the polymerization initiator is favorably an azo type such as 2,2'-azobisisobutyronitrile, 1,1'-azobis(cyclohexane-1-carbonitrile); a non-cyan type such as dimethyl-2,2'-azobisisobutyrate; or the like. Furthermore, in a case of producing a liquid dispersion of a polymer obtained by oxidative polymerization, one of the first and second substances is a monomer, while the other of the first and second substances is an oxidizing agent. In this case, the monomer is favorably a pyrrole, a thiophene, or the like. Meanwhile, the oxidizing agent is favorably hydrogen peroxide, persulfuric acid, or the like.

When such a raw material substance is dissolved or dispersed in the first liquid L1 or the low dielectric liquid LL, the concentration of the raw material substance is favorably within a range of 2% by mass to 30% by mass, both inclusive. The concentration is further preferably within a range of 5% by mass to 20% by mass, both inclusive.

(Regarding Low Dielectric Liquid LL, First Liquid L1, and Second Liquid L2)

The low dielectric liquid LL, the first liquid L1, and the second liquid L2 are favorably the same as those in the First Embodiment.

(Regarding Dispersant)

In the second liquid L2, a dispersant can also be dissolved or dispersed as necessary. Such a dispersant is favorably the same as that in the First Embodiment.

(Regarding Controlling of Reaction Product)

The reaction product is controlled favorably in the same manner as in the First Embodiment. In particular, in the present Embodiment, it is possible to control the shape of the reaction product so that the reaction product can have a fiber shape, a spherical shape, a hollow (bolus) shape, a film-like shape obtained by applying wet spinning and papermaking techniques, or other similar shapes, control the reaction product to form a composite, or control the size of the reaction product, by adjusting the potential difference between the nozzle 1 and the electrode 4, the concentrations of the substances dissolved or dispersed in the first and second liquids L1, L2 and associated with the reaction, the chemical interaction between the low dielectric liquid LL and the first liquid L1, and so forth.

As described above, in the production method and the production apparatus according to the present Embodiment, the first liquid L1 in which the first substance is dissolved or dispersed, is electrostatically sprayed into the low dielectric liquid phase P1, the first liquid L1 thus electrostatically sprayed passes through the low dielectric liquid phase P1 in which the second substance is dissolved or dispersed, and reaches the second liquid phase P2. Thereby, the reaction product between the first and second substances is dispersed in the low dielectric liquid phase P1 or the second liquid phase P2. Therefore, almost all of the first substance dissolved or dispersed in the electrostatically-sprayed first liquid L1 can react with the second substance dissolved or dispersed in the low dielectric liquid LL. In addition, at least one of the electrostatic field, and the properties of the low dielectric liquid LL, the first liquid L1, and the second liquid L2 is adjusted to control the properties of the droplets such that they are adequate for the reaction between the first and second substances. Thus, it is possible to quickly stabilize the reaction product having desired properties, and it is possible to highly efficiently produce a dispersion of the reaction product. This enables high-speed and highly-efficient production of a dispersion of the reaction product having desired properties.

In the production method and the production apparatus according to the present Embodiment, the droplet sizes are controlled by adjusting at least one of: the type of the low dielectric liquid LL, the surface tension of the first liquid L1, ionic strength of the first liquid L1, and relative permittivity of the first liquid L1, and the potential difference between the nozzle 1 and the electrode 4. Therefore, precisely controlling the droplet sizes enables such controlling that the droplets are adequate for the reaction between the first and second substances. Furthermore, since the size of the reaction product is changed by the droplet sizes, precisely controlling the droplet sizes makes it possible to obtain a reaction product having a desired size.

In the production method and the production apparatus according to the present Embodiment, one of the first and second substances is a first monomer, the other of the first and second substances is a second monomer, and the reaction product is a polymer. Meanwhile, alternatively, one of the first and second substances is a monomer, while the other of the first and second substances is a polymerization initiator, and the reaction product may be a polymer. This case enables high-speed and highly-efficient production of a dispersion of a polymer having desired properties, in particular, a desired shape in the low dielectric liquid phase P1 or the second liquid phase. Furthermore, such a dispersion of a polymer can be provided as a product of a polymer dispersion system with aqueous phase transition.

Third Embodiment

Hereinafter, description will be given of a method and an apparatus for producing a dispersion according to the Third Embodiment of the present invention.

(Regarding Apparatus for Producing Dispersion)

Figure 10:
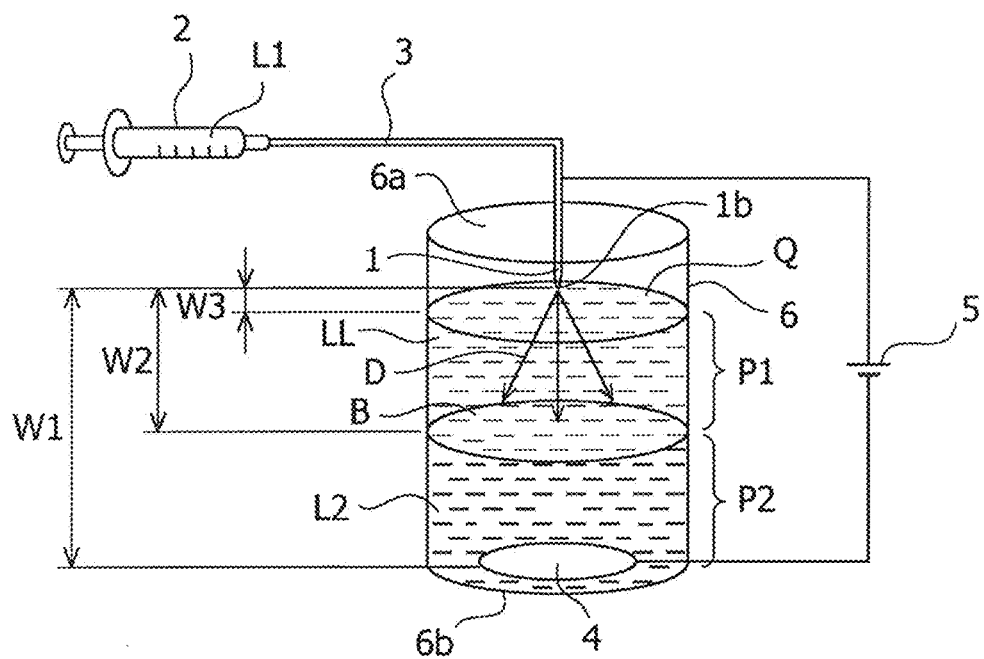
FIG. 10 is a perspective view schematically showing an apparatus for producing a dispersion according to a Third Embodiment of the present invention.

The basic configuration of the apparatus for producing a dispersion according to the present Embodiment is the same as that of the production apparatus according to the First or Second Embodiment, except for the arrangement of the spray port of the nozzle. Specifically, as shown in FIG. 10, in this production apparatus, a spray port 1b of the nozzle 1 is disposed outside the low dielectric liquid phase P1 and apart from a liquid surface Q, which is located on an opposite side of the low dielectric liquid phase P1 from the interface B, with a space at a distance W3 in such a manner that the spray port 1b of the nozzle 1 is oriented to the liquid surface Q. In particular, it is necessary to dispose the spray port 1b of the nozzle 1 above the liquid surface Q of the low dielectric liquid phase P1 while the low dielectric liquid phase P1 is located above the second liquid phase P2.

In the production apparatus according to the present Embodiment, the spray port 1b of the nozzle 1 is disposed outside the low dielectric liquid phase P1 and above the liquid surface Q, which is located on the opposite side of the low dielectric liquid phase P1 from the interface B, with the space at the distance W3 in between in such a manner that the spray port 1b of the nozzle 1 is oriented to the liquid surface Q. Accordingly, in particular, the production apparatus is preferably used for the case in which a gas is generated by the reaction between the first and second substances as in the First Embodiment. This is because the gas generated in the second liquid phase by the reaction between the first and second substances is elevated in a state of a foam containing the second liquid into the low dielectric liquid phase, so that electricity passes between the spray port of the nozzle and the second liquid phase through the second liquid contained in this foam; as a result, a potential difference between the nozzle and the electrode might be lost.

Furthermore, the configuration of the production apparatus other than the arrangement of the spray port 1b of the nozzle 1, the method for producing a dispersion, the raw material substance, the reducing agent, the low dielectric liquid LL, the first and second liquids L1, L2, and the dispersant in the present Embodiment, are the same as those in the case in which the spray port 1a of the nozzle 1 is disposed in the low dielectric liquid phase P1 as in the First or Second Embodiment. The reaction product can be controlled further under the following conditions in addition to the conditions in the First or Second Embodiment. Specifically, the distance W3 between the spray port 1b and the liquid surface Q of the low dielectric liquid phase P1 can be adjusted as appropriate in accordance with the container capacity, the potential difference, and so forth. For example, the distance W3 is favorably within a range of 0.1 cm to 5 cm, both inclusive, further preferably within a range of 0.5 cm to 1 cm, both inclusive.

As described above, in the production method and the production apparatus according to the present Embodiment, the spray port 1b of the nozzle 1 is disposed outside the low dielectric liquid phase P1 and above the liquid surface Q, which is located on the opposite side of the low dielectric liquid phase P1 from the interface B, with the space at the distance W3 in such a manner that the spray port 1b of the nozzle 1 is oriented to the liquid surface Q. Therefore, charged droplets of the first liquid L1 electrostatically sprayed from the spray port 1b are atomized at two stages of: a stage when the droplets reach the liquid surface Q of the low dielectric liquid phase P from the air, and a stage in the low dielectric liquid phase P1. Thus, the size of the reaction product to be obtained can be decreased. In other words, the charged droplets of the first liquid L1 electrostatically sprayed from the spray port 1b pass through the air in the electric field direction, and then reach the liquid surface Q of the low dielectric liquid phase P1. The charged droplets are split and atomized in the low dielectric liquid phase P1 by an electrostatic repulsive force of excessive charges contained in the charged droplets. Furthermore, the charged droplets move in the low dielectric liquid phase P1 toward the interface B and are atomized. The charged droplets thus atomized reach the interface B and react with the second liquid L2. As a result, a fine reaction product is obtained. In addition, in the present Embodiment, the droplet sizes can be further decreased when, in particular, a liquid dispersion of metal nanoparticles is produced.

In the present Embodiment, when the charged droplets of the first liquid L1 pass through the air and then reach the low dielectric liquid phase P1, the surface tension (interface tension) of the charged droplets of the first liquid L1 is decreased in this course. In addition, since the electric field is greater in the low dielectric liquid phase P1 than in air, the charged droplets are deformed and accelerated by the electrostatic force in the low dielectric liquid phase P1. Conceivably, this results in the atomization of the charged droplets.

In addition, in the present Embodiment, the potential difference between the nozzle 1 and the electrode 4 is adjusted in accordance with at least one of: the type of the low dielectric liquid LL, the type of the solvents in the first and second liquids L1, L2, the amount of the droplets sprayed from the nozzle 1 (i.e., the speed of feeding the first liquid L1 from the supply source 2 toward the nozzle 1), the type of the reducing agent, the distance W1 between the spray port 1b of the nozzle 1 and the electrode 4, the distance W2 between the spray port 1b of the nozzle 1 and the interface B, and the distance W3 between the spray port 1b of the nozzle 1 and the liquid surface Q of the low dielectric liquid phase P1. This makes it possible to further atomize the droplets. In particular, it is possible to split and atomize the charged droplets by an electrostatic repulsive force of excessive charges contained therein. Furthermore, it is possible to move and atomize the charged droplets in the low dielectric liquid phase P1 toward the interface B. In view of these, it is conceivably possible to further atomize the charged droplets by increasing the potential difference between the nozzle 1 and the electrode 4.

The Embodiments of the present invention have been described so far, but the present invention is not limited to the above-described Embodiments. The present invention can be modified and altered based on a technical idea thereof.

For example, as a First Modification Example of the present invention, the first substance in the first liquid L1 and the second substance in any one of the second liquid L2 or the low dielectric liquid LL, preferably, the second substance in the second liquid L2, are subjected to a neutralization reaction or ion exchange reaction. Thereby, a reaction product thereof is deposited so that a dispersion of the reaction product can be produced.

Here, examples of a combination of the two substances both of which may serve as the first substance or the second substance in the neutralization reaction, include a combination of an organic acid salt with an inorganic acid, and a combination of an organic base salt with an inorganic base. Subjecting these to the neutralization reaction makes it possible to produce a dispersion of the organic acid or organic base as the reaction product. As a specific example, any one of the first and second liquids L1, L2 is an aqueous solution of chitosan hydrochloride, the other of these is an alkaline aqueous solution (for example, an aqueous solution of sodium hydroxide), and the low dielectric liquid LL is hexane. When these are subjected to the neutralization reaction, a chitosan dispersion can be obtained in the second liquid L2. In this manner, when an aqueous polymer salt is used as the first substance or the second substance, a dispersion of a water insoluble polymer can be easily obtained by the neutralization reaction.

Meanwhile, an example of a combination of the two substances, both of which may serve as the first substance or the second substance in the ion exchange reaction, includes a combination of a first metal salt and a second metal salt of an organic acid. Carrying out the ion exchange reaction makes it possible to produce a dispersion of the second metal salt of the organic acid as the reaction product. As a specific example, any one of the first and second 165 liquids L1, L2 is an aqueous solution of sodium alginate, the other of these is an aqueous solution of calcium chloride, and the low dielectric liquid LL is hexane. When these are subjected to the ion exchange reaction, a dispersion of calcium alginate can be obtained in the second liquid L2. Unlike aqueous sodium alginate, since calcium alginate becomes water insoluble by ionic crosslink, a dispersion of a metal salt of a polymer like alginic acid can be easily obtained by the ion exchange reaction.

As a Second Modification Example of the present invention, spray ports of multiple nozzles are disposed in the low dielectric liquid phase, and the multiple nozzles may be respectively configured so as to electrostatically spray multiple types of the first liquid L1 in which different types of first substances are dissolved or dispersed. In this case, it is possible to form a composite of the reaction products contained in the liquid dispersion. Furthermore, the multiple nozzles may be respectively configured so as to electrostatically spray the first liquids L1 in which the same type of the first substance is dissolved or dispersed. In this case, it is possible to efficiently produce a liquid dispersion of the reaction products. Note that multiple electrodes may be provided which correspond to the multiple nozzles. In this case, the number of nozzles may be the same as or may be different from the number of electrodes.

EXAMPLES

Reference Examples 1 to 5, Examples 1 to 16, and Comparative Example 1 of the present invention will be described.

Figure 2:
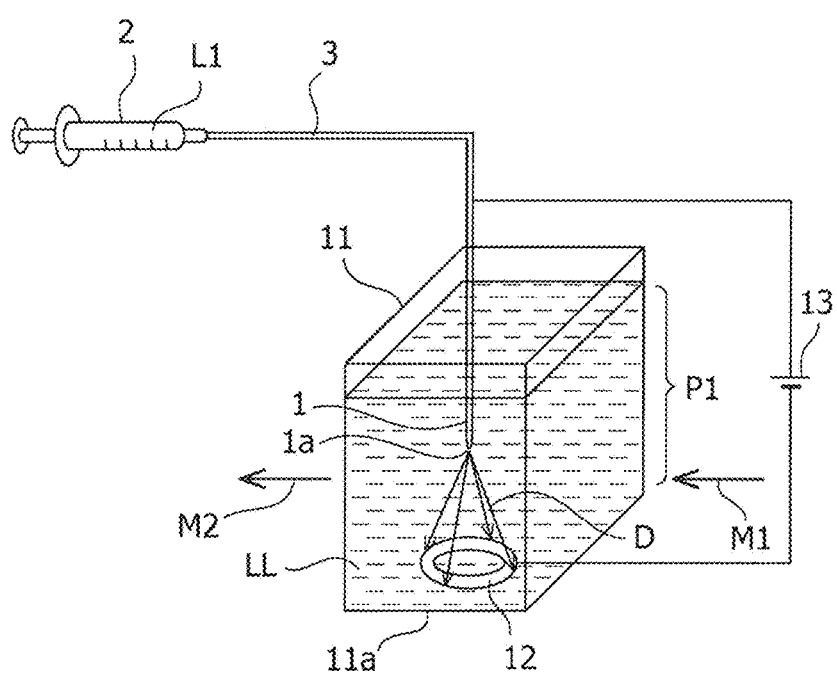
FIG. 2 is a schematic view for explaining a droplet-diameter measurement method employed in Reference Examples 1 to 5.
Figure 3:
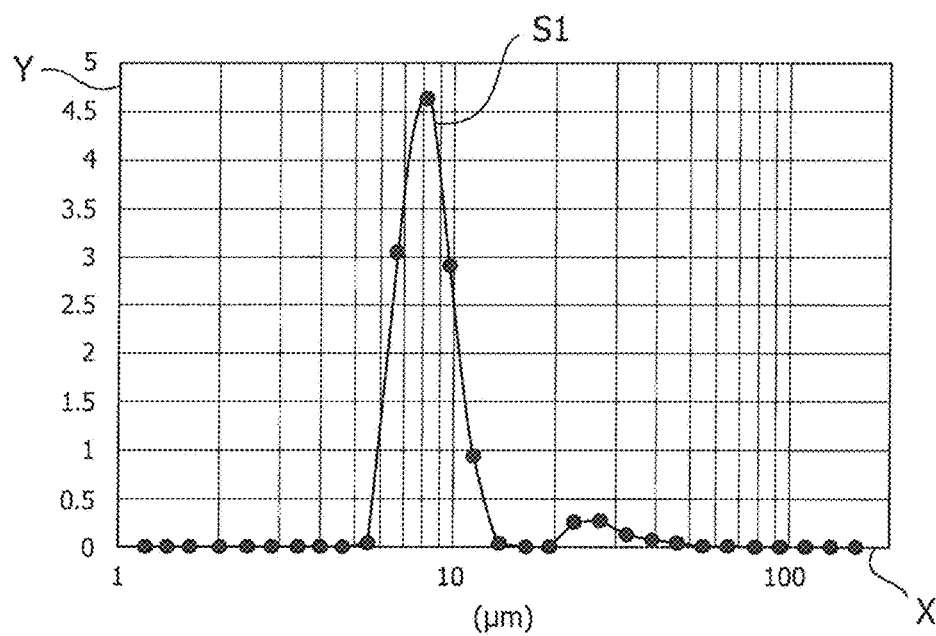
FIG. 3 is a frequency distribution graph of droplet diameters measured in Reference Example 1.
Figure 4:
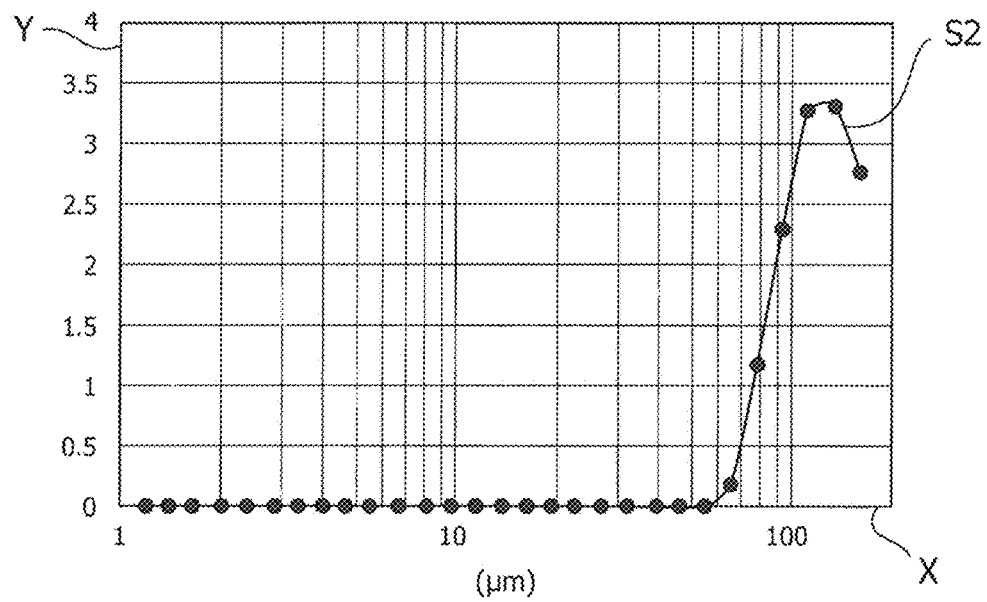
FIG. 4 is a frequency distribution graph of droplet diameters measured in Reference Example 2.
Figure 5:
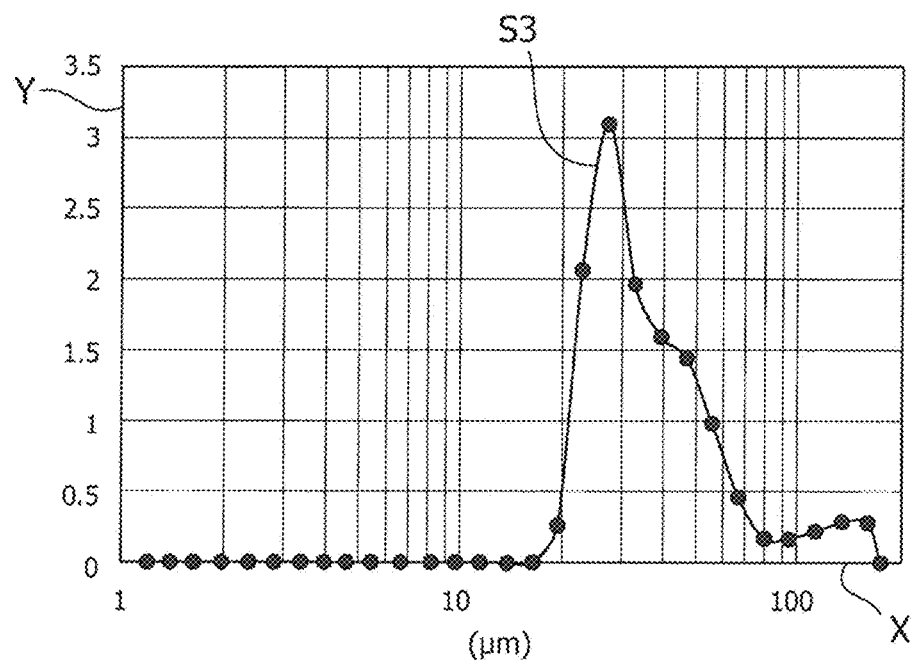
FIG. 5 is a frequency distribution graph of droplet diameters measured in Reference Example 3.
Figure 6:
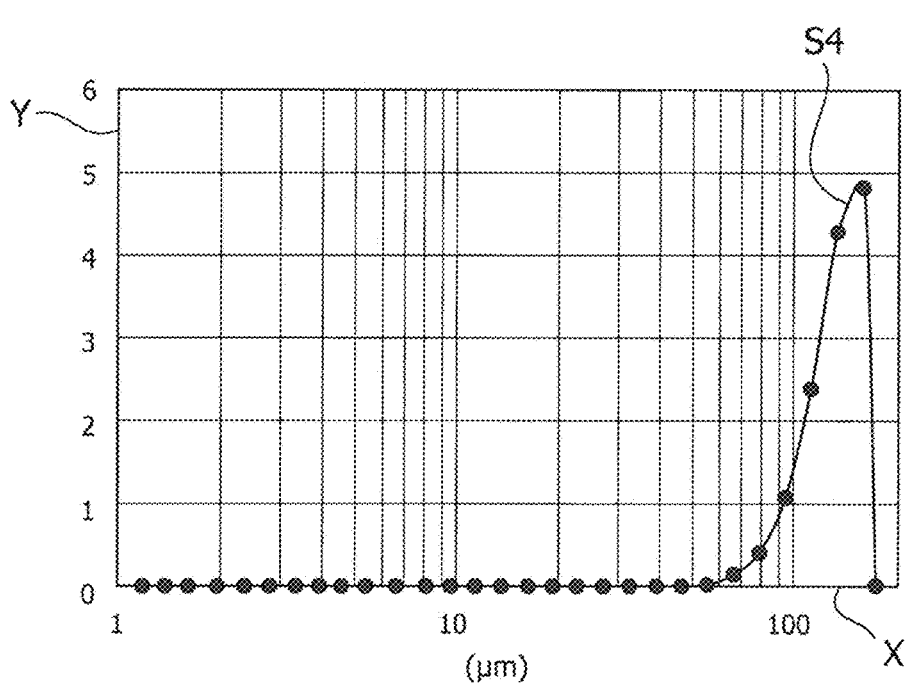
FIG. 6 is a frequency distribution graph of droplet diameters measured in Reference Example 4.
Figure 7:
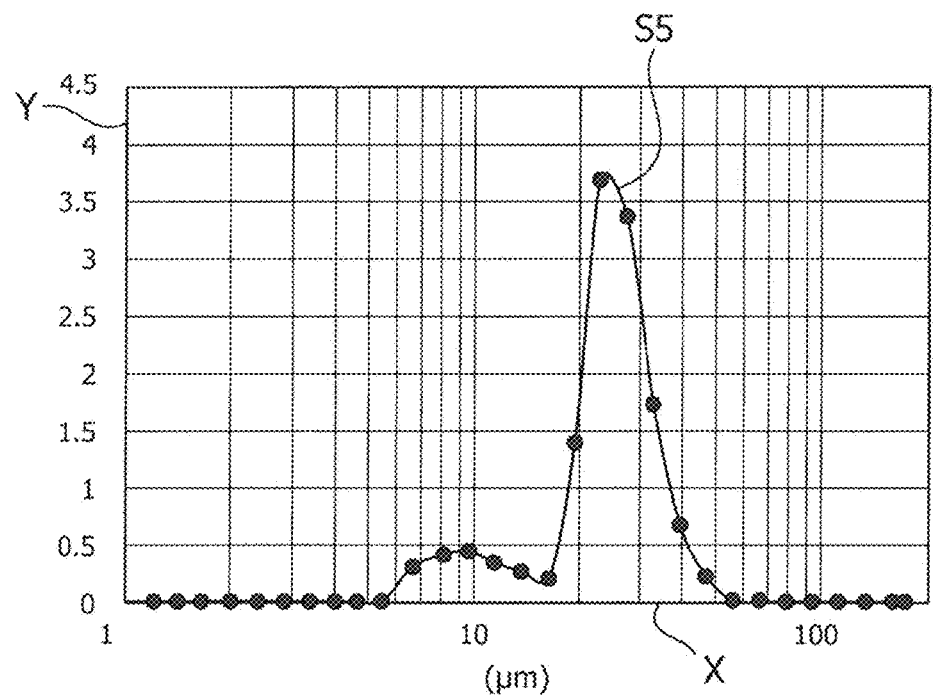
FIG. 7 is a frequency distribution graph of droplet diameters measured in Reference Example 5.

First of all, Reference Examples 1 to 5 will be described. As shown in FIG. 2, in Reference Examples 1 to 5, the diameters of droplets of the first liquid L1 sprayed from the nozzle 1 as in the present Embodiments were measured in common.

In this measurement, an optical-glass cell 11 was prepared which had a capacity of 50 mL and corresponded to an optical path length of 28 mm. This cell 11 was filled with the low dielectric liquid LL so that the low dielectric liquid phase P1 was formed in the cell 11. Furthermore, the spray port 1a of the nozzle 1 was disposed below a liquid surface of the low dielectric liquid phase P1. A ring-shaped electrode 12 was disposed on a bottom portion 11a of the cell 11 in such a manner as to face the spray port 1a of the nozzle 1 in the low dielectric liquid phase P1. A power source 13 was electrically connected to the nozzle 1 and the electrode 12. In such a state, water was supplied as the first liquid L1 from the supply source 2, and droplets of this water were sprayed from the spray port 1a of the nozzle 1 as indicated by the arrows D. In this event, the power source 13 generated a potential difference between the nozzle 1 and the electrode 12. The droplets thus electrostatically sprayed were measured using a HIEROS system manufactured by Sympatec GmbH, which had a measurement range within a range of 0.5 µm to 175 µm, both inclusive. Specifically, the cell 11 was irradiated with incident laser light as indicated by an arrow M1. Diffracted laser light M2 emitted from the cell 11 as indicated by an arrow M2 was then analyzed to measure a diameter distribution of the droplets.

Hereinafter, description will be given of the details of Reference Examples 1 to 5. Note that, in each of frequency distribution graphs of Reference Examples 1 to 5 respectively shown in FIGS. 3 to 7, the horizontal axis X represents the droplet diameter (µm) expressed by the logarithm, and the vertical axis Y represents the frequency.

Reference Example 1

In Reference Example 1, hexane was used as the low dielectric liquid LL. The speed of feeding the first liquid L1 from the supply source 2 toward the nozzle 1 was set to 0.01 mL/min (minute). The potential at the nozzle 1 side was set to +4 kV, and the potential at the electrode 12 side was set to 0 V, so that the potential difference between the nozzle 1 and the electrode 12 was 4 kV when expressed as an absolute value. The measurement of the droplet diameters under these conditions resulted in such a distribution as represented by a solid line S1 in FIG. 3 that the droplet diameters were the maximum at 8 µm.

Reference Example 2

In Reference Example 2, 1-octanol was used as the low dielectric liquid LL. The other conditions of Reference Example 2 were the same as those of Reference Example 1. The measurement of the droplet diameters under these conditions resulted in such a distribution as represented by a solid line S2 in FIG. 4 that the droplet diameters were the maximum in a region of 100 µm or more.

Reference Example 3

In Reference Example 3, a solution obtained by mixing 50 mL of hexane with 0.5 mL of ethanol was used as the low dielectric liquid LL. The speed of feeding the liquid from the supply source 2 to the nozzle 1 was set to 0.01 mL/min. The potential at the nozzle 1 side was set to +3 kV, and the potential at the electrode 12 side was set to 0 V, so that the potential difference between the nozzle 1 and the electrode 12 was 3 kV when expressed as an absolute value. The measurement of the droplet diameters under these conditions resulted in such a distribution as represented by a solid line S3 in FIG. 5 that the droplet diameters were the maximum in a region of 20 µm to 80 µm.

Reference Example 4

In Reference Example 4, a solution obtained by mixing 50 mL of hexane with 1.5 mL of ethanol was used as the low dielectric liquid LL. The other conditions of Reference Example 4 were the same as those of Reference Example 3. The measurement of the droplet diameters under these conditions resulted in such a distribution as represented by a solid line S4 in FIG. 6 that the droplet diameters were the maximum in a region of 100 µm or more.

Reference Example 5

In Reference Example 5, the potential at the nozzle 1 side was set to +5 kV, and the potential at the electrode 12 side was set to 0 V, so that the potential difference between the nozzle 1 and the electrode 12 was 5 kV when expressed as an absolute value. The other conditions of Reference Example 5 were the same as those of Reference Example 4. The measurement of the droplet diameters under these conditions resulted in such a distribution as represented by a solid line S5 in FIG. 7 that the droplet diameters were the maximum in a region of 20 µm to 50 µm.

Hereinbelow, changes in the droplet diameters will be described based on Reference Examples 1 to 5 described above. In the comparison between Reference Example 1 in which hexane was used as the low dielectric liquid LL, and Reference Example 2 in which 1-octanol was used as the low dielectric liquid LL, the droplet diameters in Reference Example 2 were larger than the droplet diameters in Reference Example 1. Therefore, it was verified that the droplet diameters change depending on the type of the low dielectric liquid LL.

In the comparison between Reference Example 3 in which the low dielectric liquid LL was used together with 0.5 mL of ethanol, and Reference Example 4 in which the low dielectric liquid LL was used together with 1.5 mL of ethanol, the droplet diameters in Reference Example 4 were larger than the droplet diameters in Reference Example 3. Therefore, it was verified that adding ethanol to hexane in the low dielectric liquid LL or increasing the amount of the ethanol added to the hexane remarkably, increases the droplet diameters.

In the comparison between Reference Example 4 in which the potential difference between the nozzle 1 and the electrode 12 was set to 3 kV when expressed as an absolute value, and Reference Example 5 in which the potential difference was set to 5 kV when expressed as an absolute value, the droplet diameters in Reference Example 5 were smaller than the droplet diameters in Reference Example 4. Therefore, it was verified that increasing the potential difference between the nozzle 1 and the electrode 12 decreases the droplet diameters.

Next, Examples 1 to 16 and Comparative Example 1 will be described. Parameters used in the evaluations here were obtained as follows.

(Regarding Average Particle Diameter of Reaction Product)

The average particle diameter of a reaction product was calculated according to the cumulant method based on measurement values obtained by using a dynamic light scattering device (manufactured by Otsuka Electronics Co., Ltd., product number ELSZ-1000).

(Regarding Production Efficiency)

Regarding the production efficiency of a liquid dispersion of a reaction product, the amount of substance of the reaction product in the liquid dispersion of the reaction product, and the amount of substance of a raw material substance dissolved or dispersed in at least one of the first liquid and the second liquid or low dielectric liquid, were calculated. Based on these, a yield was calculated. The production efficiency was evaluated based on this yield. Note that (yield)={(the amount of substance of the reaction product in the liquid dispersion of the reaction product)/(the amount of substance of the raw material substance dissolved or dispersed in at least one of the first liquid and the second liquid or low dielectric liquid)}×100.

Hereinafter, description will be given of, for example, calculations of: the metal amount of a liquid dispersion of silver nanoparticles, and the metal amount of a first or second liquid to which silver nitrate was added. Approximately 0.5 g of a liquid dispersion of silver nanoparticles precisely measured was placed in a micro Kjeldahl flask having a capacity of 30 mL. To this liquid dispersion of silver nanoparticles, 5 mL of nitric acid was added. The liquid in the micro Kjeldahl flask was heated within a range of 50° C. to 80° C. both inclusive until it became colorless and transparent. Furthermore, after cooling, distilled water was added, and the resultant was set to have a predetermined volume in a volumetric flask. The liquid thus having the predetermined volume was then measured for the metal ion concentration by using an ICP emission spectrometer (manufactured by Perkin Elmer Inc., Optima 5700 DV). Based on this metal ion concentration, the metal concentration in the liquid dispersion of silver nanoparticles was calculated. Next, the metal amount of the liquid dispersion of silver nanoparticles was calculated based on this metal concentration and on the amount of the liquid dispersion of silver nanoparticles, which is a sum of the amount of the first liquid sprayed and the amount of the second liquid placed in the container. Furthermore, the metal amount of the first or second liquid to which silver nitrate was added, was calculated based on the metal ion concentration of the first or second liquid and on the amount of the first liquid sprayed or the amount of the second liquid placed in the container.

(Regarding Stability Evaluation)

A liquid dispersion of a reaction product was left standing at room temperature for one week, and then the state thereof was visually observed. In this observation, the stability of the liquid dispersion of the reaction product was evaluated as "A+" if the amount of the precipitate was very small, was evaluated as "A" if the amount of the precipitate was small, and was evaluated as "B" if the amount of the precipitate was large. Note that the evaluations of these are lowered in the order of "A+", "A", and "B".

Hereinafter, description will be given of the details of Examples 1 to 16 and Comparative Example 1. Note that Table 1 shows the summaries of Examples 1 to 4, Table 2 shows the summary of Example 5, Table 3 shows the summaries of Examples 6 to 9, Table 4 shows the summaries of Examples 10 to 12 and Comparative Example 1, and Table 5 shows the summary of Example 16.

Example 1

As shown in Table 1, in Example 1, a mixture solvent of ethanol/water with a volume ratio of 50/50 was used as the first liquid L1. The mixture solvent was adjusted by adding thereto tetrachloroaurate tetrahydrate as a raw material substance at a concentration of 0.02 mol/L. Water was used as the second liquid L2, and the water was adjusted by adding thereto POE (polyoxyethylene) sorbitan monooleate (TWEEN 80) (average number of moles of added POE: 20 moles) as a surfactant at a concentration of 5% by mass. To the resulting aqueous solution, ascorbic acid as a reducing agent at a concentration of 0.02 mol/L was further added to also be present. Hexane was used as the low dielectric liquid LL. A beaker having a capacity of 100 mL was used as the container 6. In the beaker, 50 mL of the low dielectric liquid phase P1 and 50 mL of the second liquid phase P2 were placed in such a manner that the two phases were separated from each other.

The nozzle 1 was disposed in the low dielectric liquid phase P1, and the electrode 4 was disposed on a bottom portion of the beaker, that is, a lower portion of the second liquid phase P2. The distance W1 between the nozzle 1 and the electrode 4 was 4.5 cm, and the distance W2 between the spray port 1a of the nozzle 1 and the interface B was 2 cm. While the liquids placed in the beaker were being stirred with a magnetic stirrer, the potential at the nozzle 1 side was set to +2 kV, and the potential at the electrode 4 side was set to −2 kV, by using the power source 5 (high-voltage power source HAR manufactured by Matsusada Precision Inc.), so that the potential difference between the nozzle 1 and the electrode 4 was 4 kV when expressed as an absolute value. In such a state, the first liquid LL was sprayed from the nozzle 1 toward the electrode 4 at a liquid feeding speed of 0.02 mL/min for 60 minutes. As a result, a liquid dispersion of gold nanoparticles was obtained in the second liquid phase P2, and the liquid dispersion of gold nanoparticles was recovered. In the liquid dispersion of gold nanoparticles obtained under these conditions, the gold nanoparticles had an average particle diameter of 2 nm, the yield was 98%, and the stability was evaluated as "A".

Example 2

As shown in Table 1, in Example 2, a mixture solvent of ethanol/water with a volume ratio of 50/50 was used as the first liquid L1. The mixture solvent was adjusted by adding thereto silver nitrate as a raw material substance at a concentration of 0.1 mol/L. Thereby, a silver nitrate solution was prepared. Water was used as the second liquid L2, and the water was adjusted by adding thereto POE hydrogenated castor oil (average number of moles of added POE: 30 moles) as a surfactant at a concentration of 5% by mass. To the resulting aqueous solution, hydrazine as a reducing agent at a concentration of 0.1 mol/L was further added to also be present. Toluene was used as the low dielectric liquid LL. A beaker having a capacity of 1 L was used as the container 6. In the beaker, 600 mL of the low dielectric liquid phase P1 and 400 mL of the second liquid phase P2 were placed in such a manner that the two phases were separated from each other. The distance W1 between the nozzle 1 and the electrode 4 was 10 cm, and the distance W2 between the spray port 1a of the nozzle 1 and the interface B was 5 cm. The potential at the nozzle 1 side was set to +2 kV, and the potential at the electrode 4 side was set to −3 kV, by using the power source 5 (high-voltage power source HAR manufactured by Matsusada Precision Inc.), so that the potential difference between the nozzle 1 and the electrode 4 was 5 kV when expressed as an absolute value. The other conditions of Example 2 were the same as those of Example 1. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 38 nm, the yield was 95%, and the stability was evaluated as "A".

Example 3

As shown in Table 1, in Example 3, hexane was used as the low dielectric liquid LL. The other conditions of Example 3 were the same as those of Example 2. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 6 nm, the yield was 96%, and the stability was evaluated as "A".

Example 4

As shown in Table 1, in Example 4, a mixture solvent of ethanol/water with a volume ratio of 50/50 was used as the first liquid L1. The mixture solvent was adjusted by adding thereto raw material substances of copper nitrate trihydrate at a concentration of 0.05 mol/L and furthermore silver nitrate at a concentration of 0.05 mol/L. Water was used as the second liquid L2, and the water was adjusted by adding thereto POE sorbitan monooleate (TWEEN 80) (average number of moles of added POE: 20 moles) as a surfactant at a concentration of 5% by mass. To the resulting aqueous solution, hydrazine as a reducing agent at a concentration of 0.1 mol/L was further added to also be present. A beaker having a capacity of 1 L was used as the container 6. In the beaker, 600 mL of the low dielectric liquid phase P1 and 400 mL of the second liquid phase P2 were placed in such a manner that the two phases were separated from each other. The potential at the nozzle 1 side was set to +2 kV, and the potential at the electrode 4 side was set to −5 kV, by using the power source 5 (high-voltage power source HAR manufactured by Matsusada Precision Inc.), so that the potential difference between the nozzle 1 and the electrode 4 was 7 kV when expressed as an absolute value. The other conditions of Example 4 were the same as those of Example 2. As a result, a liquid dispersion of composite metal nanoparticles of silver nanoparticles and copper nanoparticles was obtained in the second liquid phase P2, and the liquid dispersion of composite metal nanoparticles was recovered. In the liquid dispersion of composite metal nanoparticles obtained under these conditions, the silver nanoparticles and the copper nanoparticles had an average particle diameter of 42 nm, the yield was 97%, and the stability was evaluated as "A".

Example 5

As shown in Table 2, in Example 5, a mixture solvent of ethanol/water with a volume ratio of 50/50 was used as the first liquid L1. The mixture solvent was adjusted by adding thereto hydrazine as a reducing agent at a concentration of 0.1 mol/L. Water was used as the second liquid L2, and the water was adjusted by adding thereto POE sorbitol tetraoleate (average number of moles of added POE: 40 moles) as a surfactant at a concentration of 1% by mass. The resulting aqueous solution was used further in the co-presence with silver nitrate as a raw material substance at a concentration of 0.1 mol/L. A beaker having a capacity of 1 L was used as the container 6. In the beaker, 600 mL of the low dielectric liquid phase P1 and 400 mL of the second liquid phase P2 were placed in such a manner that the two phases were separated from each other. The potential at the nozzle 1 side was set to +2 kV, and the potential at the electrode 4 side was set to −3 kV, by using the power source 5 (high-voltage power source HAR manufactured by Matsusada Precision Inc.), so that the potential difference between the nozzle 1 and the electrode 4 was 5 kV when expressed as an absolute value. The other conditions of Example 5 were the same as those of Example 2. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 670 nm, the yield was 99%, and the stability was evaluated as "A".

Example 6

As shown in Table 3, in Example 6, a mixture solvent of ethanol/water with a volume ratio of 50/50 was used as the first liquid L1. The mixture solvent was adjusted by adding thereto silver nitrate as a raw material substance at a concentration of 0.1 mol/L. Thereby, a silver nitrate solution was prepared. Water was used as the second liquid L2, and the water was adjusted by adding thereto POE sorbitol tetraoleate (average number of moles of added POE: 40 moles) as a surfactant at a concentration of 1% by mass. To the resulting aqueous solution, hydrazine as a reducing agent at a concentration of 0.1 mol/L was further added to also be present. A beaker having a capacity of 1 L was used as the container 6. In the beaker, 600 mL of the low dielectric liquid phase P1 and 400 mL of the second liquid phase P2 were placed in such a manner that the two phases were separated from each other. The potential at the nozzle 1 side was set to +1 kV, and the potential at the electrode 4 side was set to −1 kV, by using the power source 5 (high-voltage power source HAR manufactured by Matsusada Precision Inc.), so that the potential difference between the nozzle 1 and the electrode 4 was 2 kV when expressed as an absolute value. The first liquid L1 was sprayed from the nozzle 1 toward the electrode 4 at a liquid feeding speed of 0.02 mL/min for 60 minutes. The other conditions of Example 6 were the same as those of Example 2. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 27 nm, and the stability was evaluated as "A".

Example 7

As shown in Table 3, in Example 7, water was used as the first liquid L1. The water was adjusted by adding thereto silver nitrate at a concentration of 0.1 mol/L. Thereby, a silver nitrate solution was prepared. Water was used as the second liquid L2, and the water was adjusted by adding thereto POE sorbitol tetraoleate (average number of moles of added POE: 40 moles) as a surfactant at a concentration of 1% by mass. To the resulting aqueous solution, hydrazine as a reducing agent at a concentration of 0.1 mol/L was further added to also be present. A beaker having a capacity of 1 L was used as the container 6. In the beaker, 600 mL of the low dielectric liquid phase P1 and 400 mL of the second liquid phase P2 were placed in such a manner that the two phases were separated from each other. The potential at the nozzle 1 side was set to +1 kV, and the potential at the electrode 4 side was set to −1 kV, by using the power source 5 (high-voltage power source HAR manufactured by Matsusada Precision Inc.), so that the potential difference between the nozzle 1 and the electrode 4 was 2 kV when expressed as an absolute value. The first liquid L1 was sprayed from the nozzle 1 toward the electrode 4 at a liquid feeding speed of 0.02 mL/min for 60 minutes. The other conditions of Example 7 were the same as those of Example 2. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 18 nm, and the stability was evaluated as "A".

Example 8

As shown in Table 3, in Example 8, a mixture solvent of ethanol/water with a volume ratio of 50/50 was used as the first liquid L1. The mixture solvent was adjusted by adding thereto silver nitrate as a raw material substance at a concentration of 0.1 mol/L. Thereby, a silver nitrate solution was prepared. Water was used as the second liquid L2, and the water was adjusted by adding thereto POE sorbitol tetraoleate (average number of moles of added POE: 40 moles) as a surfactant at a concentration of 1% by mass. To the resulting aqueous solution, hydrazine as a reducing agent at a concentration of 0.1 mol/L was further added to also be present. A beaker having a capacity of 1 L was used as the container 6. In the beaker, 600 mL of the low dielectric liquid phase P1 and 400 mL of the second liquid phase P2 were placed in such a manner that the two phases were separated from each other. The potential at the nozzle 1 side was set to +3 kV, and the potential at the electrode 4 side was set to −3 kV, by using the power source 5 (high-voltage power source HAR manufactured by Matsusada Precision Inc.), so that the potential difference between the nozzle 1 and the electrode 4 was 6 kV when expressed as an absolute value. The first liquid L1 was sprayed from the nozzle 1 toward the electrode 4 at a liquid feeding speed of 0.02 mL/min for 60 minutes. The other conditions of Example 8 were the same as those of Example 2. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 22 nm, and the stability was evaluated as "A".

Example 9

As shown in Table 3, in Example 9, a mixture solvent of ethanol/water with a volume ratio of 50/50 was used as the first liquid L1. The mixture solvent was adjusted by adding thereto silver nitrate as a raw material substance at a concentration of 0.1 mol/L. Thereby, a silver nitrate solution was prepared. Water was used as the second liquid L2, and the water was adjusted by adding thereto POE sorbitol tetraoleate (average number of moles of added POE: 40 moles) as a surfactant at a concentration of 1% by mass. To the resulting aqueous solution, hydrazine as a reducing agent at a concentration of 0.1 mol/L was further added to also be present. As the low dielectric liquid LL, an isoparaffin was used which was a branched alkane having 10 or more carbon atoms. A beaker having a capacity of 1 L was used as the container 6. In the beaker, 600 mL of the low dielectric liquid phase P1 and 400 mL of the second liquid phase P2 were placed in such a manner that the two phases were separated from each other. The potential at the nozzle 1 side was set to +3 kV, and the potential at the electrode 4 side was set to −3 kV, by using the power source 5 (high-voltage power source HAR manufactured by Matsusada Precision Inc.), so that the potential difference between the nozzle 1 and the electrode 4 was 6 kV when expressed as an absolute value. The first liquid L1 was sprayed from the nozzle 1 toward the electrode 4 at a liquid feeding speed of 0.02 mL/min for 60 minutes. The other conditions of Example 9 were the same as those of Example 2. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 56 nm, and the stability was evaluated as "A".

Example 10

As shown in Table 4, in Example 10, a mixture solvent of ethanol/water with a volume ratio of 50/50 was used as the first liquid L1. The mixture solvent was adjusted by adding thereto silver nitrate as a raw material substance at a concentration of 0.1 mol/L. Thereby, a silver nitrate solution was prepared. Water was used as the second liquid L2, and the water was adjusted by adding thereto POE sorbitol tetraoleate (average number of moles of added POE: 40 moles) as a surfactant at a concentration of 1% by mass. To the resulting aqueous solution, hydrazine as a reducing agent at a concentration of 0.1 mol/L was further added to also be present. The distance W2 between the spray port 1a of the nozzle 1 and the interface B was 2 cm. The potential at the nozzle 1 side was set to +3 kV, and the potential at the electrode 4 side was set to −3 kV, by using the power source 5 (high-voltage power source HAR manufactured by Matsusada Precision Inc.), so that the potential difference between the nozzle 1 and the electrode 4 was 6 kV when expressed as an absolute value. The first liquid L1 was sprayed from the nozzle 1 toward the electrode 4 at a liquid feeding speed of 0.02 mL/min for 60 minutes. The other conditions of Example 10 were the same as those of Example 1. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 31 nm, and the stability was evaluated as "A".

Example 11

As shown in Table 4, in Example 11, a mixture solvent of ethanol/water with a volume ratio of 50/50 was used as the first liquid L1. The mixture solvent was adjusted by adding thereto silver nitrate as a raw material substance at a concentration of 0.1 mol/L. Thereby, a silver nitrate solution was prepared. Water was used as the second liquid L2, and the water was adjusted by adding thereto surfactants of POE sorbitol tetraoleate (average number of moles of added POE: 40 moles) at a concentration of 1% by mass and furthermore POE lauryl ether (average number of moles of added POE: 9 moles) at a concentration of 1% by mass. To the resulting aqueous solution, hydrazine as a reducing agent at a concentration of 0.1 mol/L was further added to also be present. The distance W2 between the spray port 1a of the nozzle 1 and the interface B was 2 cm. The potential at the nozzle 1 side was set to +3 kV, and the potential at the electrode 4 side was set to −3 kV, by using the power source 5 (high-voltage power source HAR manufactured by Matsusada Precision Inc.), so that the potential difference between the nozzle 1 and the electrode 4 was 6 kV when expressed as an absolute value. The first liquid L1 was sprayed from the nozzle 1 toward the electrode 4 at a liquid feeding speed of 0.02 mL/min for 60 minutes. The other conditions of Example 11 were the same as those of Example 1. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 31 nm, and the stability was evaluated as "A+".

Example 12

In Example 12, water was used as the first liquid L1. The water was adjusted by adding thereto silver nitrate as a raw material substance at a concentration of 0.1 mol/L. Thereby, a silver nitrate solution was prepared. Water was used as the second liquid L2, and the water was adjusted by adding thereto POE sorbitol tetraoleate (average number of moles of added POE: 40 moles) as a surfactant at a concentration of 1% by mass. To the resulting aqueous solution, hydrazine as a reducing agent at a concentration of 0.1 mol/L was further added to also be present. As the low dielectric liquid LL, an isoparaffin was used. A beaker having a capacity of 2000 mL was used as the container 6. In the beaker, 1200 mL of the low dielectric liquid phase P1 and 800 mL of the second liquid phase P2 were placed in such a manner that the two phases were separated from each other.

The nozzle 1 was disposed in the low dielectric liquid phase P1, and the electrode 4 was disposed on a bottom portion of the beaker, that is, a lower portion of the second liquid phase P2. The distance W2 between the spray port 1a of the nozzle 1 and the interface B was 8 cm. While the liquids placed in the beaker were being stirred with a magnetic stirrer, the potential at the nozzle 1 side was set to +2 kV, and the potential at the electrode 4 side was set to −2 kV, by using the power source 5 (high-voltage power source HAR manufactured by Matsusada Precision Inc.), so that the potential difference between the nozzle 1 and the electrode 4 was 4 kV when expressed as an absolute value. In such a state, the first liquid L1 was sprayed from the nozzle 1 toward the electrode 4 at a liquid feeding speed of 0.02 mL/min for 60 minutes. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 12 nm, and the stability was evaluated as "A".

Example 13

In Example 13, 10 mL of water was used as the first liquid L1. The water was adjusted by adding thereto 0.58 g of hexamethylenediamine as a first monomer of a raw material substance and furthermore 0.4 g of sodium hydroxide was added. As the second liquid L2, 100 mL of water was used. As the low dielectric liquid LL, 100 mL of hexane was used, and 0.915 g of adipoyl chloride was dissolved as a second monomer of a raw material substance in the hexane for use. A beaker having a capacity of 200 mL was used as the container 6. In the beaker, 100 mL of the low dielectric liquid phase P1 and 100 mL of the second liquid phase P2 were placed in such a manner that the two phases were separated from each other.

Figure 8:
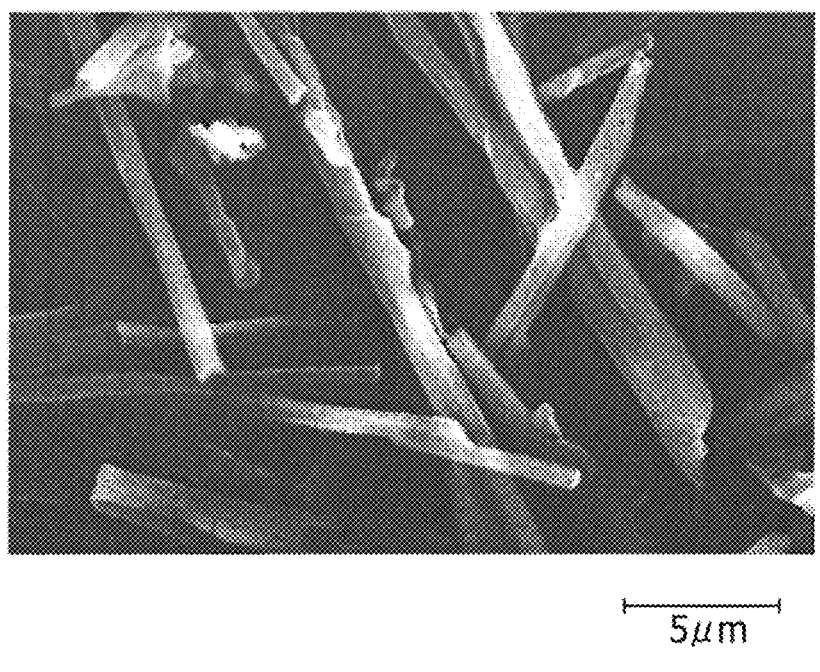
FIG. 8 is an enlarged photograph of 6,6-nylon fibers obtained in Example 13.

The nozzle 1 was disposed in the low dielectric liquid phase P1, and the electrode was disposed on a lower portion of the second liquid phase P2. While the liquids placed in the beaker were being stirred with a magnetic stirrer, the potential at the nozzle 1 side was set to +2 kV, and the potential at the electrode 4 side was set to −2 kV, by using the power source 5 (high-voltage power source HAR manufactured by Matsusada Precision Inc.), so that the potential difference between the nozzle 1 and the electrode 4 was 4 kV when expressed as an absolute value. In such a state, the first liquid L1 was sprayed from the nozzle 1 toward the electrode 4 at a liquid feeding speed of 0.06 mL/min for 180 minutes. As a result, fibrous 6,6-nylon made of a reaction product between hexamethylenediamine and adipoyl chloride was deposited in the low dielectric liquid phase P1, and by-product sodium chloride (NaCl) was recovered in the second liquid phase P2. Furthermore, the fibrous reaction product was fractionated by centrifugation and then washed with hexane. As a result, a liquid dispersion of 6,6-nylon was obtained in the low dielectric liquid phase P1, and the liquid dispersion of 6,6-nylon was recovered. Thus, 620 mg of 6,6-nylon fibers were obtained as shown in FIG. 8. When the fibers were observed with an electron microscope, the fibers had an average particle diameter of 1 μm to 2 μm, and the fibers had aspect ratios of 20 to 40. The 6,6-nylon had a glass transition temperature of 39.4° C. Note that the following equation represents the chemical equation of such a reaction.

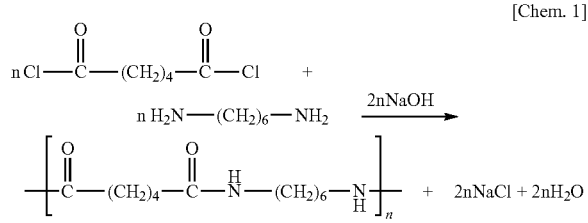

[Chem. 1]

Example 14

In Example 14, 10 mL of water was used as the first liquid L1. The water was adjusted by adding thereto 1.16 g of hexamethylenediamine as a first monomer of a raw material substance. As the second liquid L2, 100 mL of water was used, and 1 g of polyoxyethylene lauryl ether (average number of moles of added POE: 9 moles) was dispersed as a surfactant in the water. As the low dielectric liquid LL, 100 mL of toluene was used, and 1.68 g of hexamethylene diisocyanate was dissolved as a second monomer of a raw material substance in the toluene. A beaker having a capacity of 200 mL was used as the container 6. In the beaker, 100 mL of the low dielectric liquid phase P1 and 100 mL of the second liquid phase P2 were placed in such a manner that the two phases were separated from each other.

The nozzle 1 was disposed in the low dielectric liquid phase P1, and the electrode 4 was disposed on a lower portion of the second liquid phase P2. While the liquids placed in the beaker were being stirred with a magnetic stirrer, the potential at the nozzle side 1 was set to +2 kV, and the potential at the electrode 4 side was set to −3 kV, by using the power source 5 (high-voltage power source HAR manufactured by Matsusada Precision Inc.), so that the potential difference between the nozzle 1 and the electrode 4 was 5 kV when expressed as an absolute value. In such a state, the first liquid L1 was sprayed from the nozzle 1 toward the electrode 4 at a liquid feeding speed of 0.12 mL/min for 90 minutes. As a result, dispersed polyurea particles were obtained in the second liquid phase P2, and the dispersed polyurea particles were recovered in the second liquid phase P2. When the dispersed resin particles were observed with an electron microscope, the dispersed resin particles had an average particle diameter of 4 μm to 5 μm. The polyurea had a glass transition temperature of 121° C.

Example 15

In Example 15, 100 mL of water was used as the first liquid L1. In the water, 1 g of chitosan (manufactured by KIMICA Corporation, general-purpose industrial grade: LL, average molecular weight: 50,000 to 100,000) as a raw material substance was broken down and further neutralized and dissolved with 0.6 mL of 12 N hydrochloric acid. Thereby, a chitosan hydrochloride solution was prepared. Water was used as the second liquid L2, and the water was adjusted by adding thereto sodium hydroxide to make the pH 10. Thereby, an aqueous solution was prepared. Hexane was used as the low dielectric liquid LL. A beaker having a capacity of 200 mL was used as the container 6. In the beaker, 100 mL of the low dielectric liquid phase P1 and 100 mL of the second liquid phase P2 were placed in such a manner that the two phases were separated from each other.

Figure 9:
FIG. 9 is an enlarged photograph of chitosan particles obtained in Example 15.

The nozzle 1 was disposed in the low dielectric liquid phase P1, and the electrode 4 was disposed on a bottom portion of the beaker, that is, a lower portion of the second liquid phase P2. The distance W2 between the spray port 1a of the nozzle 1 and the interface 13 was 2 cm. While the liquids placed in the beaker were being stirred with a magnetic stirrer, the potential at the nozzle 1 side was set to +2 kV, and the potential at the electrode 4 side was set to −3 kV, by using the power source 5 (high-voltage power source HAR manufactured by Matsusada Precision Inc.), so that the potential difference between the nozzle 1 and the electrode 4 was 5 kV when expressed as an absolute value. In such a state, the first liquid L1 was sprayed from the nozzle 1 toward the electrode 4 at a liquid feeding speed of 0.02 mL/min for 60 minutes. As a result, a liquid dispersion of chitosan particles was obtained in the low dielectric liquid phase P1, and the liquid dispersion of chitosan particles was recovered. Thus, the chitosan particles were obtained as shown in FIG. 9. The chitosan in the chitosan liquid dispersion obtained under these conditions was observed with an electron microscope and had an average particle diameter of 500 nm, and the stability was evaluated as "A".

Example 16

In Example 16, the spray port 1b of the nozzle 1 was disposed outside the low dielectric liquid phase P1 and above the liquid surface Q of the low dielectric liquid phase P1 with the space at the distance W3 in such a manner that the spray port 1b of the nozzle 1 was oriented to the liquid surface Q. Further, the distance W1 between the nozzle 1 and the electrode 4 was 11 cm. As shown in Table 5, the distance W2 between the spray port 1b of the nozzle 1 and the interface B was 6 cm. The distance W3 between the spray port 1b and the liquid surface Q of the low dielectric liquid phase P1 was 0.5 cm. Furthermore, the other conditions of Example 16 were the same as those of Example 5. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 18 nm, the yield was 99%, and the stability was evaluated as "A".

Comparative Example 1

As shown in Table 4, in Comparative Example 1, a mixture solvent of ethanol/water with a volume ratio of 50/50 was used as the first liquid. The mixture solvent was adjusted by adding thereto silver nitrate as a raw material substance at a concentration of 0.1 mol/L. Thereby, a silver nitrate solution was prepared. Water was used as the second liquid, and the water was adjusted by adding thereto POE sorbitan monooleate (average number of moles of added POE: 20 moles) as a surfactant at a concentration of 5% by mass. To the resulting aqueous solution, hydrazine as a reducing agent at a concentration of 0.1 mol/L was further added to also be present. Hexane was used as the low dielectric liquid. A beaker having a capacity of 100 mL was used as the container. In the beaker, 50 mL of the low dielectric liquid phase and 50 mL of the second liquid phase were placed in such a manner that the two phases were separated from each other. In addition, a dropping nozzle was disposed in the low dielectric liquid phase, but no electric field was applied. In such a state, the first liquid was dropped from the dropping nozzle toward the electrode at a liquid feeding speed of 0.02 mL/min for 60 minutes. As a result, a liquid dispersion of silver nanoparticles was obtained in the second liquid phase P2, and the liquid dispersion of silver nanoparticles was recovered. In the liquid dispersion of silver nanoparticles obtained under these conditions, the silver nanoparticles had an average particle diameter of 890 nm, the yield was immeasurable due to precipitation, and the stability was evaluated as "B".

Based on Examples 1 to 16 and Comparative Example 1 described above, the average particle diameters, yields, and stability evaluations of the reaction products will be described below. In the liquid dispersion of gold nanoparticles of Example 1, the average particle diameter of the gold nanoparticles was on the order of nm, the yield was high, and the stability was also high. Therefore, it was verified that the present invention makes it possible to precisely control the size of the reaction product and makes it possible to produce the reaction product with high efficiency.

In the comparison between Example 2 in which toluene was used as the low dielectric liquid LL and Example 3 in which hexane was used as the low dielectric liquid LL, the average particle diameter of the silver nanoparticles in Example 3 was smaller than the average particle diameter of the silver nanoparticles in Example 2. Therefore, it was verified that the average particle diameter of the reaction product changes depending on the type of the low dielectric liquid LL.

In Example 4, silver nanoparticles and copper nanoparticles were successfully obtained at the same time. Furthermore, in the liquid dispersion of the composite metal nanoparticles obtained in Example 4, the average particle diameter of the silver nanoparticles and the copper nanoparticles was on the order of nm, the yield was high, and the stability was also high. Therefore, it was verified that it is possible to precisely control the size of the reaction product and it is possible to produce the reaction product with high efficiency, while enabling such a composite formation that multiple types of reaction products are obtained at the same time.

In Example 5, a reducing agent was dissolved in the first liquid L1, and silver nitrate was dissolved as a metal salt in the second liquid L2. In such a liquid dispersion of silver nanoparticles obtained in Example 5, the average particle diameter of the silver nanoparticles was on the order of nm, the yield was high, and the stability was also high. Therefore, it was verified that the present invention makes it possible to precisely control the size of the reaction product and makes it possible to produce the reaction product with high efficiency, even when a reducing agent is dissolved in the first liquid L1 and a metal salt is dissolved in the second liquid L2. Furthermore, in the comparison between Example 5 as described above and Example 3 in which silver nitrate was dissolved as a metal salt in the first liquid L1 and a reducing agent was dissolved in the second liquid L2, the average particle diameter of the silver nanoparticles in Example 5 was larger than the average particle diameter of the silver nanoparticles in Example 3. Therefore, it was verified that the average particle diameter of the reaction product considerably changes depending on which of the first and second liquids L1, L2 a metal salt or a reducing agent is dissolved in. In particular, it was verified that in the case in which the metal salt was dissolved in the first liquid L1 and the reducing agent was dissolved in the second liquid L2, the average particle diameter of the reaction product was smaller than the average particle diameter of the reaction product in the case in which the reducing agent was dissolved in the first liquid L1 and the metal salt was dissolved in the second liquid L2.

In the comparison between Example 6 in which the mixture solvent of ethanol/water with a volume ratio of 50/50 was used as the first liquid L1, and Example 7 in which water was used as the first liquid L1, the average particle diameter of the silver nanoparticles in Example 7 was smaller than the average particle diameter of the silver nanoparticles in Example 6. Therefore, it was verified that the average particle diameter of the reaction product changes depending on the type of the solvent used as the first liquid L1. In particular, when the solvents of the first and second liquids L, L2 are the same, the miscibility between the two is increased. It was verified that this condition increases the mixing speed of the first liquid L1 with the second liquid L2 and decreases the size of the reaction product.

In the comparison between Example 6 in which the potential difference between the nozzle 1 and the electrode 4 was 2 kV, and Example 8 in which the potential difference was 6 kV, the average particle diameter of the silver nanoparticles in Example 8 was smaller than the average particle diameter of the silver nanoparticles in Example 6. Therefore, it was verified that the average particle diameter of the reaction product is decreased when increasing the potential difference between the nozzle 1 and the electrode 4.

In the comparison between Example 8 in which hexane was used as the low dielectric liquid LL, and Example 9 in which an isoparaffin was used as the low dielectric liquid LL, the average particle diameter of the silver nanoparticles in Example 9 was larger than the average particle diameter of the silver nanoparticles in Example 8. Therefore, it was verified that the average particle diameter of the reaction product changes depending on the type of the low dielectric liquid LL. In particular, since the viscosity of hexane differs from the viscosity of the isoparaffin, it was verified that the average particle diameter of the reaction product changes depending on the viscosity of the low dielectric liquid LL.

In the comparison between Example 8 in which the distance W2 between the spray port 1a of the nozzle 1 and the interface B was 5 cm, and Example 10 in which the distance W2 was 2 cm, the average particle diameter of the silver nanoparticles in Example 10 was larger than the average particle diameter of the silver nanoparticles in Example 8. Furthermore, in the comparison between Example 9 in which the distance W2 between the spray port 1a of the nozzle 1 and the interface B was 5 cm, and Example 12 in which the distance W2 was 8 cm, the average particle diameter of the silver nanoparticles in Example 9 was larger than the average particle diameter of the silver nanoparticles in Example 12. Therefore, it was verified that the average particle diameter of the reaction product is changed according to changing the distance W2 between the spray port 1a of the nozzle 1 and the interface B. In particular, it was verified that, in a range of the distance W2 between the spray port 1a of the nozzle 1 and the interface B from 2 cm to 8 cm, both inclusive, the average particle diameter of the reaction product is decreased according to increasing the distance W2.

In the comparison between Example 10 in which one type of a nonionic surfactant was used as the second liquid L2, and Example 11 in which two types of nonionic surfactants were used as the second liquid L2, the stability evaluation in Example 11 was higher than the stability evaluation in Example 10. Therefore, it was verified that the use of two or more nonionic surfactants as the second liquid L2 improves the dispersion stability of metal nanoparticles.

In Example 13, 6,6-nylon fibers were obtained, polyurea particles were obtained in Example 14, and chitosan particles were obtained in Example 15. Therefore, it was verified that the present invention makes it also possible to obtain particles other than metal nanoparticles.

In the comparison between Example 5 in which the spray port 1a of the nozzle 1 was disposed in the low dielectric liquid phase P1, and Example 16 in which the spray port 1b of the nozzle 1 was disposed above the liquid surface Q of the low dielectric liquid phase P1, the average particle diameter of the silver nanoparticles in Example 16 was smaller than the average particle diameter of the silver nanoparticles in Example 5. Therefore, it was verified that disposing the spray port 1b of the nozzle 1 above the liquid surface Q of the low dielectric liquid phase P1 changes the average particle diameter of the reaction product.

When no electrostatic field was generated between the nozzle and the electrode as in Comparative Example 1, precipitation occurred in the liquid dispersion of silver nanoparticles. The dispersion stability of the silver nanoparticles in Comparative Example 1 was low in comparison with the dispersion stability in the case of generating an electrostatic field between the nozzle 1 and the electrode 4 as in the present invention. Therefore, it was verified that generating an electrostatic field between the nozzle 1 and the electrode 4 and increasing the mixing efficiency improve the dispersion stability of the reaction product.

TABLE 1

|  |  | Example 1 | Example 2 | Example 3 | Example 4 |
|---|---|---|---|---|---|
| First liquid side | raw material substance | tetrachloroaurate tetrahydrate | silver nitrate | silver nitrate | silver nitrate and copper nitrate trihydrate |
|  | raw material substance concentration | 0.02 mol/L | 0.1 mol/L | 0.1 mol/L | each 0.05 mol/L |
|  | solvent (first liquid) | 50% by capacity ethanol aqueous solution | 50% by capacity ethanol aqueous solution | 50% by capacity ethanol aqueous solution | 50% by capacity ethanol aqueous solution |
| Second liquid side | dispersant | POE (20 moles) sorbitan monooleate | POE (30 moles) hydrogenated castor oil | POE (30 moles) hydrogenated castor oil | POE (20 moles) sorbitan monooleate |
|  | dispersant concentration | 5% by mass | 5% by mass | 5% by mass | 5% by mass |
|  | reducing agent | ascorbic acid | hydrazine | hydrazine | hydrazine |
|  | reducing agent concentration | 0.02 mol/L | 0.1 mol/L | 0.1 mol/L | 0.1 mol/L |
| Low dielectric liquid |  | hexane | toluene | hexane | hexane |
| Distance between nozzle and interface |  | 2 cm | 5 cm | 5 cm | 5 cm |
| Potential | difference | 4 kV | 5 kV | 5 kV | 7 kV |
|  | nozzle side | +2 kV | +2 kV | +2 kV | +2 kV |
|  | electrode side | −2 kV | −3 kV | −3 kV | −5 kV |
| Liquid dispersion | average particle diameter | 2 nm | 38 nm | 6 nm | 42 nm |
|  | yield | 98% | 95% | 96% | 97% |
|  | stability | A | A | A | A |

TABLE 2

|  |  | Example 5 |
|---|---|---|
| First liquid side | reducing agent | hydrazine |
|  | reducing agent concentration | 0.1 mol/L |
|  | solvent (first liquid) | 50% by capacity ethanol aqueous solution |
| Second liquid side | raw material substance | silver nitrate |
|  | raw material substance concentration | 0.1 mol/L |
|  | dispersant | POE (40 moles) sorbitol tetraoleate |
|  | dispersant concentration | 1% by mass |
| Low dielectric liquid |  | hexane |
| Distance between nozzle and interface |  | 5 cm |
| Potential | difference | 5 kV |
|  | nozzle side | +2 kV |
|  | electrode side | −3 kV |
| Liquid dispersion | average particle diameter | 670 nm |
|  | yield | 99% |
|  | stability | A |

TABLE 3

|  |  | Example 6 | Example 7 | Example 8 | Example 9 |
|---|---|---|---|---|---|
| First liquid side | raw material substance | silver nitrate | silver nitrate | silver nitrate | silver nitrate |
|  | raw material substance concentration | 0.1 mol/L | 0.1 mol/L | 0.1 mol/L | 0.1 mol/L |
|  | solvent (first liquid) | 50% by capacity ethanol aqueous solution | water | 50% by capacity ethanol aqueous solution | 50% by capacity ethanol aqueous solution |
| Second liquid side | dispersant | POE (40 moles) sorbitol tetraoleate | POE (40 moles) sorbitol tetraoleate | POE (40 moles) sorbitol tetraoleate | POE (40 moles) sorbitol tetraoleate |

TABLE 3-continued

|  |  | Example 6 | Example 7 | Example 8 | Example 9 |
|---|---|---|---|---|---|
|  | dispersant concentration | 1% by mass | 1% by mass | 1% by mass | 1% by mass |
|  | reducing agent | hydrazine | hydrazine | hydrazine | hydrazine |
|  | reducing agent concentration | 0.1 mol/L | 0.1 mol/L | 0.1 mol/L | 0.1 mol/L |
|  | Low dielectric liquid | hexane | hexane | hexane | isoparaffin |
|  | Distance between nozzle and interface | 5 cm | 5 cm | 5 cm | 5 cm |
| Potential | difference | 2 kV | 2 kV | 6 kV | 6 kV |
|  | nozzle side | +1 kV | +1 kV | +3 kV | +3 kV |
|  | electrode side | −1 kV | −1 kV | −3 kV | −3 kV |
| Liquid dispersion | average particle diameter | 27 nm | 38 nm | 22 nm | 56 nm |
|  | yield | — | — | — | — |
|  | stability | A | A | A | A |

TABLE 4

|  |  | Example 10 | Example 11 | Example 12 | Comparative Example 1 |
|---|---|---|---|---|---|
| First liquid side | raw material substance | silver nitrate | silver nitrate | silver nitrate | silver nitrate |
|  | raw material substance concentration | 0.1 mol/L | 0.1 mol/L | 0.1 mol/L | 0.1 mol/L |
|  | solvent (first liquid) | 50% by capacity ethanol aqueous solution | 50% by capacity ethanol aqueous solution | 50% by capacity ethanol aqueous solution | 50% by capacity ethanol aqueous solution |
| Second liquid side | dispersant | POE (40 moles) sorbitol tetraoleate | POE (40 moles) sorbitol tetraoleate and POE (9 moles) lauryl ether | POE (40 moles) sorbitol tetraoleate | POE (20 moles) sorbitan monooleate |
|  | dispersant concentration | 1% by mass | each 1% by mass | 1% by mass | 5% by mass |
|  | reducing agent | hydrazine | hydrazine | hydrazine | hydrazine |
|  | reducing agent concentration | 0.1 mol/L | 0.1 mol/L | 0.1 mol/L | 0.1 mol/L |
|  | Low dielectric liquid | hexane | hexane | isoparaffin | hexane |
|  | Distance between nozzle and interface | 2 cm | 2 cm | 8 cm | dropping pump was used |
| Potential | difference | 6 kV | 6 kV | 4 kV |  |
|  | nozzle side | +3 kV | +3 kV | +2 kV |  |
|  | electrode side | −3 kV | −3 kV | −2 kV |  |
| Liquid dispersion | average particle diameter | 31 nm | 31 nm | 12 nm | 890 nm |
|  | yield | — | — | 97% | immeasurable due to precipitation |
|  | stability | A | A+ | A | B |

TABLE 5

|  |  | Example 16 |
| --- | --- | --- |
| First liquid side | reducing agent | hydrazine |
|  | reducing agent concentration | 0.1 mol/L |
|  | solvent (first liquid) | 50% by capacity ethanol aqueous solution |
| Second liquid side | raw material substance | silver nitrate |
|  | raw material substance concentration | 0.1 mol/L |
|  | dispersant | POE (40 moles) sorbitol tetraoleate |
|  | dispersant concentration | 1% by mass |
|  | Low dielectric liquid | hexane |
|  | Distance between nozzle and interface | 6 cm |
| Potential difference | | 5 kV |
|  | nozzle side | +2 kV |
|  | electrode side | −3 kV |
| Liquid dispersion | average particle diameter | 18 nm |
|  | yield | 99% |
|  | stability | A |

REFERENCE SIGNS LIST

1 Electrospray nozzle (Nozzle)
1a, 1b Spray port
4 Electrode
6 Container
LL Low dielectric liquid
L1 First liquid
L2 Second liquid
P1 Phase made of low dielectric liquid (Low dielectric liquid phase)
P2 Phase made of second liquid (Second liquid phase)
Q Liquid surface of low dielectric liquid phase (Liquid surface)
B Interface
D Arrow
W1, W2, W3 Distance
X Horizontal axis
Y Vertical axis
S1 to S5 Solid line

The invention claimed is:

1. A method for producing a dispersion of a reaction product between first and second substances, the method comprising the step of:
electrostatically spraying the first substance which is dissolved or dispersed in a first liquid, from a spray port of a nozzle which is:
disposed in a phase of a low dielectric liquid out of two phases of a phase of a second liquid and the phase of the low dielectric liquid arranged one on top of the other with two-phase separation; or
disposed at a position apart from the two phases but close to the phase of the low dielectric liquid in such a manner that the spray port of the nozzle is oriented to a liquid surface of the phase of the low dielectric liquid,
while an electrode is disposed in the phase of the second liquid, and the second substance is dissolved or dispersed in any one of a second liquid and a low dielectric liquid,
so that droplets, charged by generating a potential difference between the nozzle and the electrode, of the first liquid in which the first substance has been dissolved or dispersed, are electrostatically sprayed from the spray port of the nozzle, and the first liquid which has been electrostatically sprayed, passes through the phase of the low dielectric liquid and reaches the phase of the second liquid to obtain the reaction product dispersed in the phase of the second liquid or in the phase of the low dielectric liquid.

2. The method for producing a dispersion according to claim 1, wherein
the first and second liquids are aqueous solution systems miscible with each other.

3. The method for producing a dispersion according to claim 1, wherein
sizes of the droplets are controlled by adjusting at least one of a type of the low dielectric liquid, a surface tension of the first liquid, an ionic strength of the first liquid, and a relative permittivity of the first liquid, and the potential difference between the nozzle and the electrode.

4. The method for producing a dispersion according to claim 1, wherein
the second substance is dissolved or dispersed in the second liquid out of the second liquid and the low dielectric liquid.

5. The method for producing a dispersion according to claim 4, wherein
one of the first and second substances is a metal salt,
the other of the first and second substances is a reducing agent,
a surfactant is further dissolved or dispersed in the second liquid, and
the reaction product is metal nanoparticles dispersed in the phase of the second liquid.

6. The method for producing a dispersion according to claim 5, wherein
the surfactant is a nonionic surfactant.

7. The method for producing a dispersion according to claim 1, wherein
the second substance is dissolved or dispersed in the low dielectric liquid out of the second liquid and the low dielectric liquid.

8. The method for producing a dispersion according to claim 7, wherein
one of the first and second substances is a first monomer,
the other of the first and second substances is a second monomer, and
the reaction product is a polymer.

9. The method for producing a dispersion according to claim 7, wherein
one of the first and second substances is a monomer,
the other of the first and second substances is a polymerization initiator, and
the reaction product is a polymer.

10. An apparatus for producing a dispersion of a reaction product between first and second substances, the apparatus comprising:
a container configured so as to store a phase of a second liquid and a phase of a low dielectric liquid in such a state that the two phases lie one on top of the other with two-phase separation;
a nozzle having a spray port which is disposed in the phase of the low dielectric liquid, or is disposed at a position apart from the two phases but close to the phase of the low dielectric liquid in such a manner that the spray port of the nozzle is oriented to a liquid surface of the phase of the low dielectric liquid; and
an electrode disposed in the phase of the second liquid, wherein the first substance has been dissolved or dispersed in a first liquid and the second substance has been dissolved or dispersed in any one of the second liquid and the low dielectric liquid; and droplets, charged by generating a potential difference between the nozzle and the electrode, of the first liquid in which the first substance has been dissolved or dispersed, are electrostatically sprayed from the spray port of the nozzle, and the first liquid which has been electrostatically sprayed, passes through the phase of the low dielectric liquid and reaches the phase of the second liquid to obtain the reaction product dispersed in the phase of the second liquid or in the phase of the low dielectric liquid.

\* \* \* \* \*

UNITED STATES PATENT AND TRADEMARK OFFICE
CERTIFICATE OF CORRECTION

PATENT NO. : 10,086,353 B2
APPLICATION NO. : 15/506606
DATED : October 2, 2018
INVENTOR(S) : Wakisaka et al.

Page 1 of 1

It is certified that error appears in the above-identified patent and that said Letters Patent is hereby corrected as shown below:

In the Specification

Column 15, Line 9: Please correct "L" to read -- L1 --

Column 20, Line 63: Please correct "second 165 liquids" to read -- second liquids --

Column 24, Line 61: Please correct "LL" to read -- L1 --

Signed and Sealed this
Twenty-sixth Day of February, 2019

Andrei Iancu
*Director of the United States Patent and Trademark Office*